United States Patent
Mikami et al.

(10) Patent No.: US 7,099,747 B2
(45) Date of Patent: Aug. 29, 2006

(54) MOTION EDITING APPARATUS AND METHOD FOR ROBOT DEVICE, AND COMPUTER PROGRAM

(75) Inventors: Tatsuo Mikami, Kanagawa (JP); Atsushi Miyamoto, Kanagawa (JP); Jinichi Yamaguchi, 5-14-38, Tamadaira, Hino-shi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 0 days.

(21) Appl. No.: 10/970,977

(22) Filed: Oct. 22, 2004

(65) Prior Publication Data
US 2005/0125099 A1    Jun. 9, 2005

(30) Foreign Application Priority Data
Oct. 24, 2003  (JP)  ............................. 2003-365239

(51) Int. Cl.
G06F 19/00    (2006.01)

(52) U.S. Cl. .................. 700/245; 318/568.12; 901/1; 180/8.1

(58) Field of Classification Search .............. 700/245, 700/246, 250, 254, 260, 261, 262; 318/568.12, 318/568.15; 901/1, 2; 180/8.1, 8.6; 701/23
See application file for complete search history.

(56) References Cited

U.S. PATENT DOCUMENTS

| | | | | |
|---|---|---|---|---|
| 5,355,064 | A * | 10/1994 | Yoshino et al. | 318/568.12 |
| 5,936,367 | A * | 8/1999 | Takenaka | 318/568.12 |
| 6,580,969 | B1 * | 6/2003 | Ishida et al. | 700/245 |
| 6,697,709 | B1 * | 2/2004 | Kuroki et al. | 700/245 |
| 6,714,201 | B1 * | 3/2004 | Grinstein et al. | 345/474 |
| 6,832,131 | B1 * | 12/2004 | Hattori et al. | 700/245 |
| 6,832,132 | B1 * | 12/2004 | Ishida et al. | 700/245 |
| 6,898,485 | B1 * | 5/2005 | Kuroki et al. | 700/245 |
| 6,901,313 | B1 * | 5/2005 | Mori et al. | 700/245 |
| 2005/0154492 | A1 * | 7/2005 | Takenaka et al. | 700/245 |
| 2005/0228539 | A1 * | 10/2005 | Takenaka et al. | 700/245 |
| 2005/0267630 | A1 * | 12/2005 | Kajita et al. | 700/245 |

OTHER PUBLICATIONS

Hirai et al., The development of Honda humaoid robot, 1998, IEEE, p. 1321-1326.*

Danehiro et al., Virtual humanoid robot platform to develop controllers of real humanoid robots without porting, 2001, IEEE, p. 1093-1099.*

* cited by examiner

Primary Examiner—Thomas Black
Assistant Examiner—McDieunel Marc
(74) Attorney, Agent, or Firm—Frommer Lawrence & Haug LLP; William S. Frommer; Thomas F. Presson

(57) ABSTRACT

To implement a dynamic, elegant motion performance of an actual robot, a motion editing system is provided which includes a motion editor to edit motions of an upper body and whole body of the robot and a foot trajectory editor to create a gait pattern and lower-body motion to stabilize the entire robot. The foot trajectory editor includes the same gait pattern generator and motion stabilized as those installed in the actual robot. Before performing the edited motions on the actual robot, the motions are created, corrected and stabilized on a 3D viewer.

25 Claims, 35 Drawing Sheets

MOTION EDITING APPARATUS AND METHOD FOR ROBOT DEVICE, AND COMPUTER PROGRAM

BACKGROUND OF THE INVENTION

1. Field of the Invention

The present invention generally relates to a motion editing system and method and a computer program, destined from supporting the motion creation and edition to describe a predetermined motion pattern of a robot, and more particularly to a motion editing system and method and a computer program, for a legged locomotion robot device which conducts various kinds of work.

2. Description of the Related Art

A mechanical apparatus designed based on the electrical and magnetic engineering to mimic human motions is called "robot". The term "robot" is said to have been derived from a Slavic word "ROBOTA (slave machine)". In Japan, the robots have become more widely prevalent at the end of 1960s. Many of such robots were industrial ones such as the manipulators and conveyance robots destined for automation and unmanning of the production operations in factories.

The recent researches and developments of the legged locomotive robots designed to have the physical mechanism and motions of bipedal upright-walking animals such as human beings, monkeys, etc., and it is more and more expected that such legged locomotive robots can be used in the practical applications. The bipedal motion in an upright posture is more unstable and difficult to control in posture and walking than the motions on crawlers, four or six feet. However, the bipedal upright motion is more advantageous in the flexible motion over irregular ground surfaces, irregular access routes on which there exist obstacles, and stepped surfaces such as a stepway or ladder.

Also, the legged locomotive robots designed to implement the biological mechanism and motions of the human being is generally called "humanoid robot". The humanoid robot can support the human activity in the residential environment and other daily life, for example.

Almost all the human working spaces and dwelling spaces are defined for compliance with the body mechanism and behavior of the human being making bipedal upright-walking, and thus have many barriers against the current mechanical systems using wheels or any other driving devices as the moving means. Therefore, to work for the human beings and also for a further acceptability in the human dwelling spaces, the mechanical systems or robots should desirably be able to move in nearly the same range as the human moving range. It is considerably expected just in this respect that the practical applicability of the robots can be attained.

The recent legged locomotion robots have a high capability of information processing. Hence, such a robot itself may be considered as a computer system. In other words, a series of complicated moving sequences comprised of motion patterns performed by a robot or a plurality of fundamental motion patterns in combination, that is, a motion, is formulated for the robot by making similar work to the computer programming.

Therefore, for further prevalence of robots, it is essential to popularize many motion data for operation of the robots. Accordingly it is demanded to build a development environment for edition of robot motions.

Robots will no doubt be used more widely in the industrial field as well as in the general households and daily life. As regards the entertainment robot products among others, choreographers and designers should desirably be able to create motion contents even with no great knowledge of the computer, computer programming and motion control, and common consumers will buy such robots for their amusement. For such common users, there should desirably be provided a supporting tool for creating and editing a sequence of operations for a robot relatively easily and efficiently by an interactive procedure, that is, a motion editing system.

A robot includes a plurality of control points such as joints. Therefore, by making input of a position and speed (joint angle and angular speed) of each of the control points, it is possible to edit a robot motion. In this respect, the edition of robot motions is similar to the creation of an animation of a character in a computer graphic. Naturally, however, an motion in a virtual space is different from a real motion. With only the articulation being changed, the legged locomotion robot cannot be made to perform any user-desired motion. The robot should be able to support itself stably on the feet in making a motion without falling down. In other words, the robot-motion edition should be able to have the robot keep a stable posture in making a motion while making sure that the motion is being positively performed by the robot itself.

Many legged locomotion robots have applied therein ZMP (zero moment point) as a stability criterion. With this technology, a point where the moment is zero is detected inside a support polygon formed between a sole touchdown point and floor or ground surface (cf. "LEGGED LOCOMOTION ROBOTS" by Miomir Vukobratovic). In the case of bipedal legged locomotion robots, since the support polygon is extremely small, it is very difficult to stabilize the posture of the robots.

There is already proposed a motion editing system to edit a robot motion by entering values for the control points of the robot from a monitor screen. However, there is not yet available any robot-motion editing system intended for use to have an actual robot perform an edited motion and which is also capable of checking the posture of the actual robot and correcting the actual-robot motion to stabilize the posture. If the robot cannot keep any stable posture with the edited motion and it cannot perform the edited motion itself, the motion edition is substantially useless.

OBJECT AND SUMMARY OF THE INVENTION

Accordingly, the present invention has an object to overcome the above-mentioned drawbacks of the related art by providing an improved robot-motion editing system and method and an improved computer program, capable of supporting the edition of a motion pattern with a consideration being given to the feasibility of the edited motion on an actual robot.

Another object of the present invention is to provide an improved robot-notion editing system and method and an improved computer program, capable of correcting an edited motion while confirming the edited motion being performed by an actual robot.

According to one aspect of the present invention, there is provided a motion editing system for a robot device including an upper body, a lower body formed from a plurality of legs which enable walking of the robot and a plurality of articulations, the system including according to the present invention:

a motion editor for editing motions of the upper body and entire robot; and a foot trajectory editor for creating a gait pattern and a motion of the upper body and combining the created upper-body motion and motion of the upper body or entire robot, edited by the motion editor to stabilize of the entire robot.

In the above motion editing system, the foot trajectory editor includes the same locomotion engine as that installed in the actual robot. The "locomotion engine" referred to herein is a combination of a gait pattern generator and motion stabilizer. The locomotion engine makes a real-time creation of a gait pattern by a whole-body integrated control, and stabilizes the foot motion and whole-body motion on the basis of the ZMP equation.

Therefore, with the motion editing system according to the present invention, the user or designer can create motions of the upper and lower bodies of the robot and then make sure the entire motion of the robot before having the robot perform the motions. Therefore, the user can implement an attractive application of the robot such as an up-tempo dance performance via the edition and creation of such motions.

Also, motion creation, correction and stabilization by the motion editor and foot trajectory editor can be attained on a 3D (three-dimensional) viewer.

More specifically, the motion editing system according to the present invention may be provided with many user interfaces and thus is suitable for use to create and edit various motions such as stable bipedal walking, dance performance synchronous with a music, etc. Since the same gait pattern creating and posture stabilization as those installed in the actual robot are used for creation of motions, it is possible to have the robot accurately perform created and edited motions.

Also, the foot trajectory editor may be adapted to output data on a stabilized motion in a predetermined file format. In such a case, a transportable storage medium such as a memory stick may be used to transfer the motion data file to the robot.

Also, as an example of output-data file format, data on trajectories of joint angles of the entire robot whose motion has been stabilized may be in a data format including information about a formula of interpolation between control points. With such a data format, it is possible to considerably reduce the data size in comparison with the data format in which joint angles of the entire robot are arranged in a time series.

Also, to copy edited joint angles, the motion editor may be given a mirror copying function to copy symmetrical joint angles of a selected joint and a symmetrical copying function to copy the articulations in both directions.

With the mirror copying function, a joint angle of the right arm, if selected for example, is copied to a corresponding joint of the left arm. Also, the symmetrical copying function provides the same function as the mirror copying function except for the both-directional copying. When both the right and left arms are selected, for example, an articulation of one of the arms is swapped with that of the other arm.

Also, the gait pattern generator included in the locomotion engine may be adapted to create a series or trajectories representing foot positions and directions of both the right and left legs from the sequence of walking commands and parameters. The "walking parameters" referred to herein include a step length, step cycle or some other parameters. By representing a gait pattern as step trajectories of both the right and left legs during a step cycle, a gait pattern can be manipulated more easily during edition. That is, by setting a walking parameter for each step, it is possible to design a gait pattern. For example, various steps in a walking, danc-ing and the like may be defined by appropriate walking parameters. With the gait pattern generator according to the present invention, the motion designer may not designate any detailed trajectories of leg joints in bipedal walking for these data can be derived from the walking parameters by performing operations under a software.

Also, the motion stabilizer included in the locomotion engine receives, at each control cycle, a gait pattern, and movement of pelvis and joints of the upper body, and calculates a whole-body motion which implements a stable bipedal walking on the basis of the ZMP-based stability criterion.

With such a function of the foot trajectory editor, it is possible to view, on the motion editing system, a motion which is the same one as will be performed on an actual robot before testing that motion on the actual robot to verify the feasibility of the motion.

When motion data has been specified, the motion editing system according to the present invention has only to transfer a sequence of walking commands, pelvis key frame and upper-body motion to the control system for the control system itself can determine a whole-body motion in detail. The design concept for such a cooperation between the control system and motion editing system permits to reduce the size of motion data to be loaded to the robot for the purpose of data transfer.

Also, the foot trajectory editor may be adapted to correct walking parameters for a specific step in an edited gait pattern. The foot trajectory editor may further include an automatic correcting means for automatically correct the entire gait pattern along with the step correction.

When a gait pattern is automatically corrected, the user can specify, as a constraint, a parameter which should not desirably be changed during automatic correction, for example. Also, a group of successive steps under the same constraint condition may be defined as a "constraint group". In the constraint group, correctable walking parameters are prioritized and the gait pattern is automatically corrected in the order of the priorities.

In the automatic correction, parameters set the steps within the constraint group are corrected in the order of their priorities in principle so that the gait pattern can be corrected completely within the constraint group as far as possible with no influence on other steps outside the constraint group.

Also, in case steps outside the constraint group will be influenced, the gait pattern is corrected as less as possible in the order of priorities of parameters set on the steps outside the constraint group or in the same order.

Also, steps under no constraint condition have their parameters corrected passively due to correction of other steps in some cases. In case both steps under no constraint condition before and after the constraint group are under the same condition, the step after the constraint group is pref-erentially corrected. However, this is not always true depending upon the internal setting.

When an automatic correction is to be done, it is informed via the user interface to the user for inquiry of his decision and acknowledgement of the automatic correction.

Also, the motion editing system according to the present invention may be adapted to support a multi-robot editing environment for creating and editing motions of a plurality of robots at the same time.

In this case, the work can be simplified considerably by creating a motion for the first one of actual robots and reutilizing the motion data for the first actual robot for creating a motion for the second one of the actual robots.

Then, to make sure the formation, the motion data for all the actual robots can be loaded to the leg trajectory editor, and viewed to make sure that each of the actual robots behaves as expected.

According to another aspect of the present invention, there is provided a computer program described in a computer-readable format to execute, in a computer system, a motion edition for a robot device including an upper body, a lower body formed from a plurality of legs which enable walking of the robot and a plurality of articulations, the computer program including according to the present invention:

a motion editing module for editing motions of the upper body and entire robot; and a foot trajectory editing module for creating a gait pattern and a motion of the upper body and combining the created upper-body motion and motion of the upper body or entire robot, edited by the motion editing module to stabilize of the entire robot.

As above, the computer program according to the second aspect of the present invention defines a computer program described in the computer-readable format to perform a predetermined operation in a computer system. In other words, the computer program according to the second aspect of the present invention, installed in a computer system, can work cooperatively to provide a similar operation to that performed by the aforementioned robot-motion editing system or method according to the first aspect of the present invention.

According to the present invention, there can be provided the improved robot-motion editing system and method and computer program, capable of supporting the edition of a motion pattern with a consideration being given to the feasibility of an edited motion on an actual robot.

Also, according to the present invention, there can be provided the improved robot-motion editing system and method and computer program, capable of correcting an edited motion while making sure the edited motion being performed by the actual robot.

As above, the motion editing system according to the present invention includes the motion editor to edit motions of the upper body and whole body of a robot, and the foot trajectory editor to create a gait pattern and a motion of the lower body and stabilize the entire robot. The foot trajectory editor includes the same pattern generator and motion generator as those installed in an actual robot. Since a motion is created, corrected and stabilized on the 3D viewer before it is performed on the actual robot, a simple edition permits the actual robot to perform a dynamic, elegant motion performance.

These objects and other objects, features and advantages of the present invention will become more apparent from the following detailed description of the best mode for carrying out the present invention when taken in conjunction with the accompanying drawings.

DETAILED DESCRIPTION OF THE PREFERRED EMBODIMENTS

The present invention will be described in detail below concerning the embodiments thereof with reference to the accompanying drawings.

A. Mechanical Construction of the Legged Locomotion Robot

Figure 1:
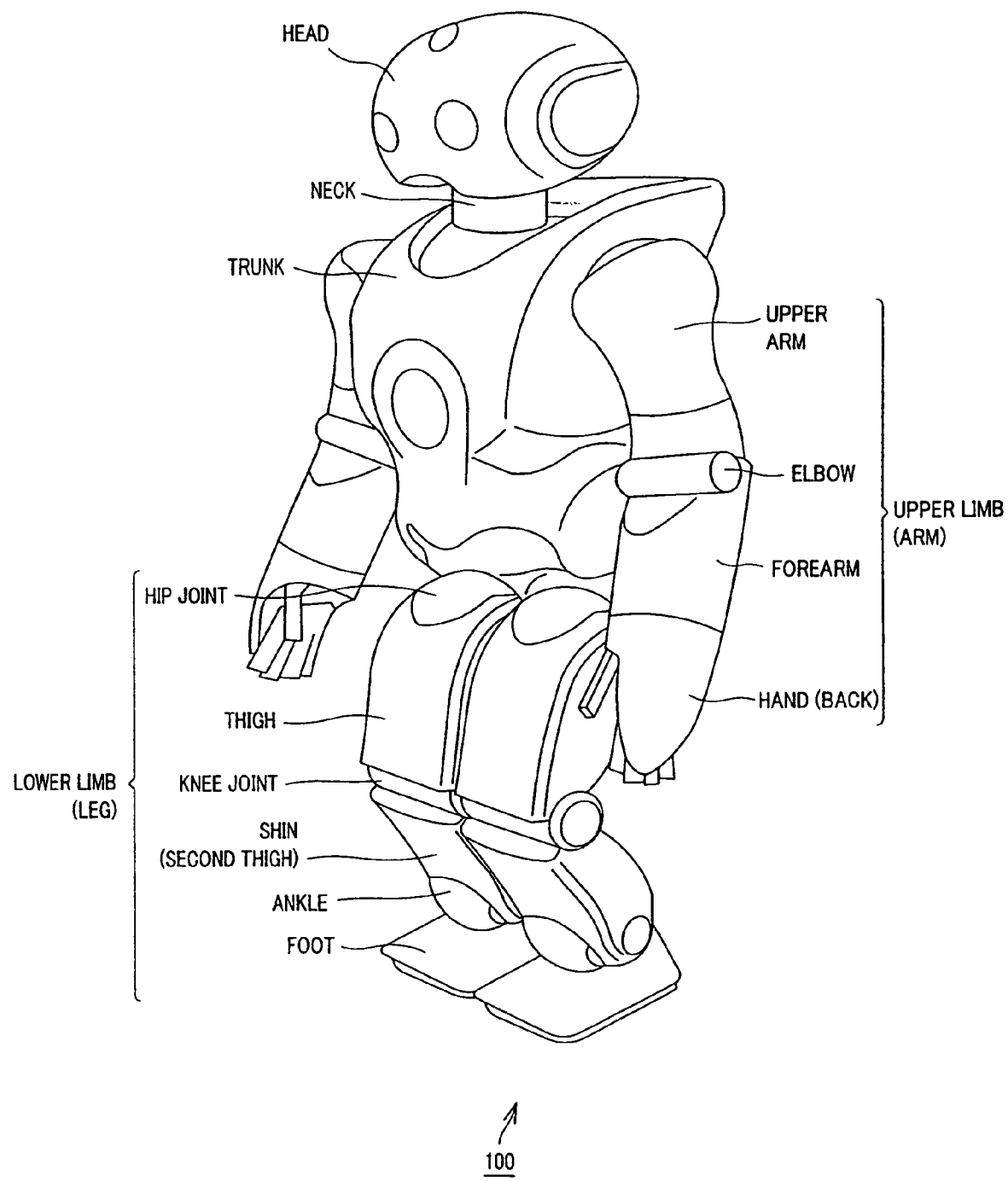
FIG. 1 is a front view of an embodiment of the legged locomotion robot according to the present invention, which is in upright position.
Figure 2:
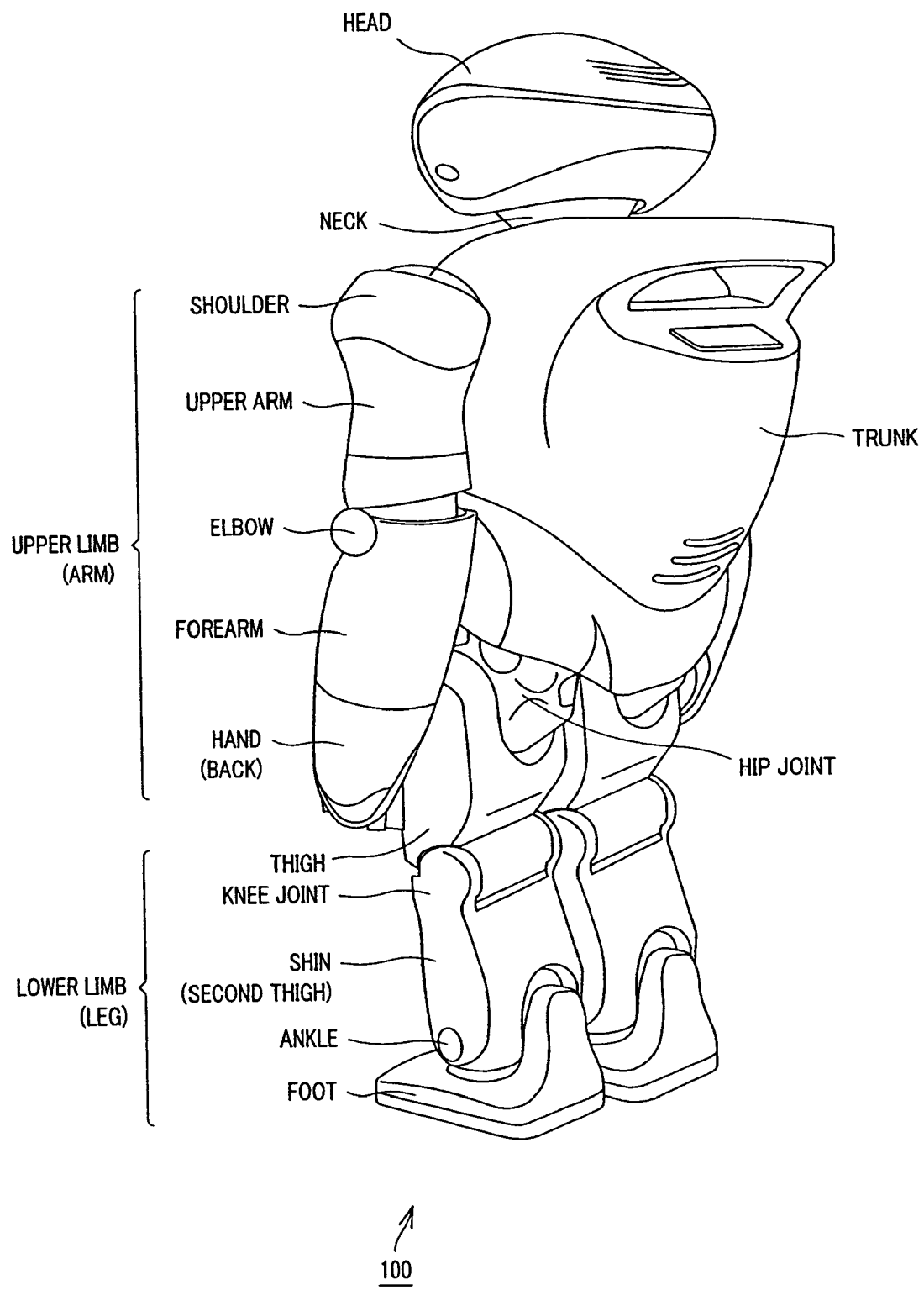
FIG. 2 is a rear view of the legged locomotion robot being in the upright position in FIG. 1.

FIGS. 1 and 2 show the appearance of a legged locomotion robot, generally indicated with a reference 100, for which a motion is to be edited by the motion editing system according to the present invention. The legged locomotion robot 100 is called a "humanoid" type robot. As shown, the legged locomotion robot 100 includes a body, head, right and left upper limbs, and right and left lower limbs for the legged motion. A control unit (not shown) built in the robot body, for example, provides a system control of the entire robot.

Each of the right and left lower limbs includes a thigh, knee joint, second thigh, ankle and foot. The lower limb is coupled by a hip joint to the bottom of the hip. Each of the right and left upper limb includes an upper arm, elbow joint and forearm. The upper limb is coupled by a shoulder joint to each upper edge of the trunk. Also, the head is coupled by a neck joint nearly to the upper end center of the trunk.

The control unit includes a housing in which there are mounted a main controller to control the driving of the joint actuators included in the legged locomotion robot 100 and process external inputs from sensors (will further be described), and peripheral devices such as a power circuit, etc. The control unit may further include a remote-controlling communication interface and communication device.

The legged locomotion robot 100 can make bipedal walking owing to the whole-body integrated motion control by the control unit. Generally, the bipedal walking can be implemented by repeating a step cycle divided in the following operation phases:

(1) Support on a single foot (left foot) with the right foot off the walking surface (2) Support on both feet with the right foot being in touch with the walking surface (3) Support on a single foot (right foot) with the left foot off the walking surface (4) Support on both feet with the left foot being in touch with the walking surface The walking of the legged locomotion robot 100 can be controlled by pre-planning a target trajectory for the lower limbs and correcting the planned trajectory in each of the above phases. That is, in the double-foot support phases, the height of the hip is corrected by a constant value using a total amount of correction with stopping the lower-limb trajectory correction. In the single support phases, the trajectory is corrected for the relative geometric relation between the ankle of the foot whose trajectory has been corrected and the hip to fall within the planned trajectory.

Generally, the control of the robot for a stable posture including the trajectory correction of the walking motion uses the ZMP-based walking stability criterion. The ZMP-based walking stability criterion is based on the "d'Alembert's principle" that the gravity, inertial force and their moments will be balanced with a floor reaction force as a reaction of the walking surface to the walking system and its moment. The consequence of this mechanical deduction is such that on or inside the sides of a supporting polygon (ZMP stable region) defined by points the foot sole touches and walking surface, there exists a point where the pitch and rolling-axis moment are zero, that is, a zero-moment point (ZMP). In this case, there is used an interpolation by a quintic equation to assure a continuous position, speed and acceleration for a smaller deviation from a ZMP (zero-moment point).

Figure 3:
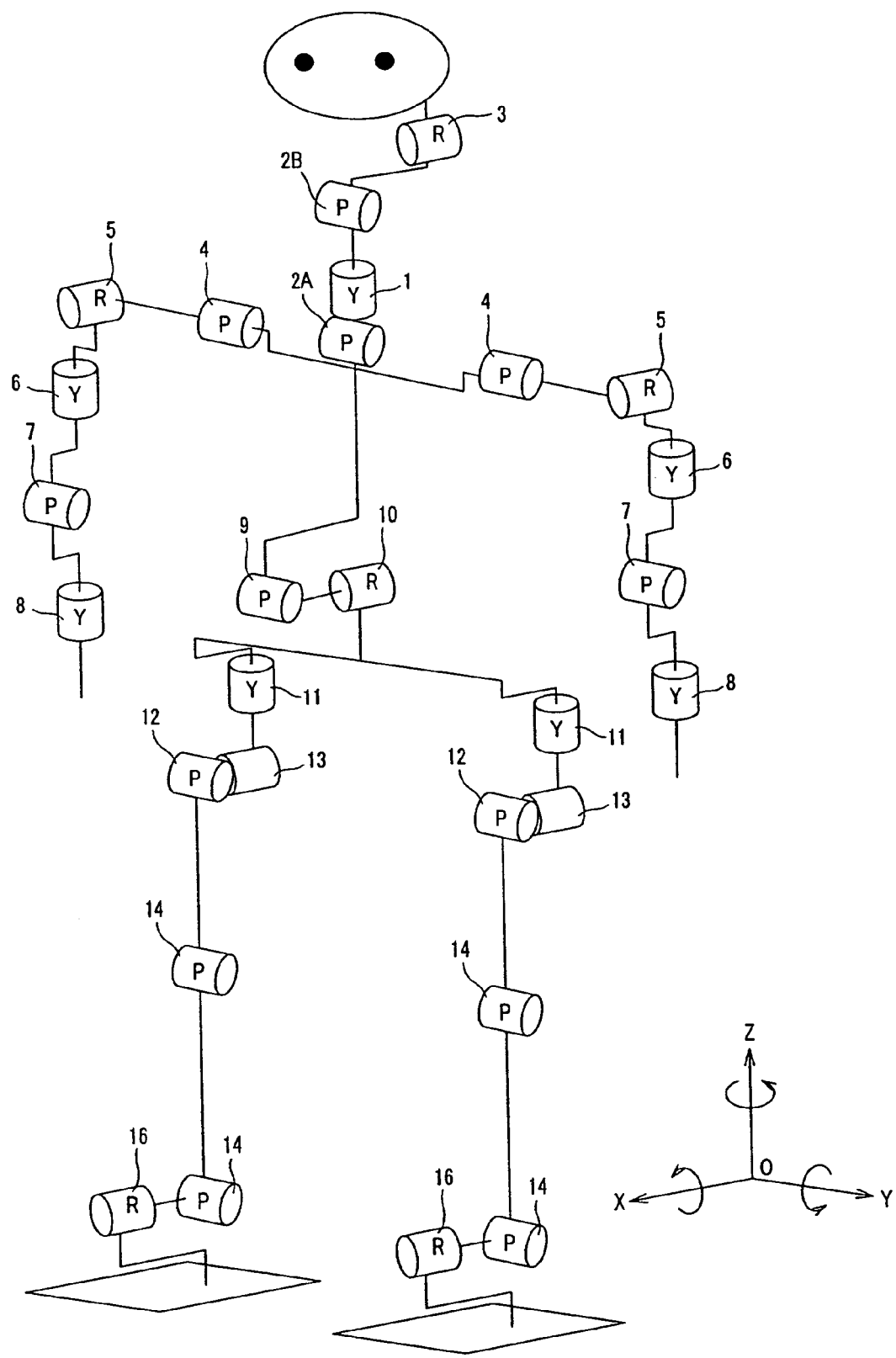
FIG. 3 schematically illustrates the degrees of freedom, as joints, of the legged locomotion robot according to the present invention.

FIG. 3 schematically illustrates the degrees of freedom, as the joints, of the legged locomotion robot 100. As shown, the legged locomotion robot 100 is a structure including a trunk to which there is coupled a plurality of extremities or limbs such as an upper limb including two arms and a head and a lower limb including two legs which provide the motion of the robot 100.

The neck joint supporting the head has three degrees of freedom including a next joint yaw axis 1, neck joint pitch axe 2, and a neck joint roll axis 3.

Also, each of the arms has, as degrees of freedom, a shoulder joint pitch axis 4, shoulder joint roll axis 5, upper arm yaw axis 6, elbow joint pitch axis 7, wrist joint yaw axis 8, and a hand. The hand is actually a structure including a plurality of fingers, namely, a plurality of joints and degrees of freedom.

The trunk has two degrees of freedom including a trunk pitch axis 9 and trunk roll axis 10.

Also, each leg included in the lower limb includes a hip joint yaw axis 11, hip joint pitch axis 12 and hip joint roll axis 13, knee joint pitch axis 14, ankle joint pitch axis 15 and ankle joint roll axis 16, and a foot.

However, the legged locomotion robot 100 directed for entertainment may not have all the above-mentioned degrees of freedom or the degrees of freedom of such a robot are not limited to the above-mentioned ones. The degrees of freedom, that is, the number of joints, may of course be increased or decreased appropriately depending upon the restrictions and requirements imposed on the robot design and manufacture.

Each of the aforementioned degrees of freedom of the legged locomotion robot 100 is actually an actuator. The actuator should preferably be small and lightweight because the robot should have a profile approximate to the natural shape of a human being with no excessive bulges and an unstable bipedal structure should be controlled to keep a stable posture. This embodiment of the present invention employs a small AC servo actuator having a servo control system formed in one chip and which is coupled directly to a gear and incorporated in a motor unit. An AC servo actuator of this type is disclosed in the Japanese Published Unexamined Patent Application No. 2000-299970 already assigned to the Applicant of the present invention, for example. This embodiment of the present invention adopts, as a directly coupled gear, a low deceleration gear which will attain a passive characteristic of the driving system itself which is required for the robot 100 in which a major consideration is given to the physical interaction with the human being.

B. Construction of Control System for the Legged Locomotion Robot

Figure 4:
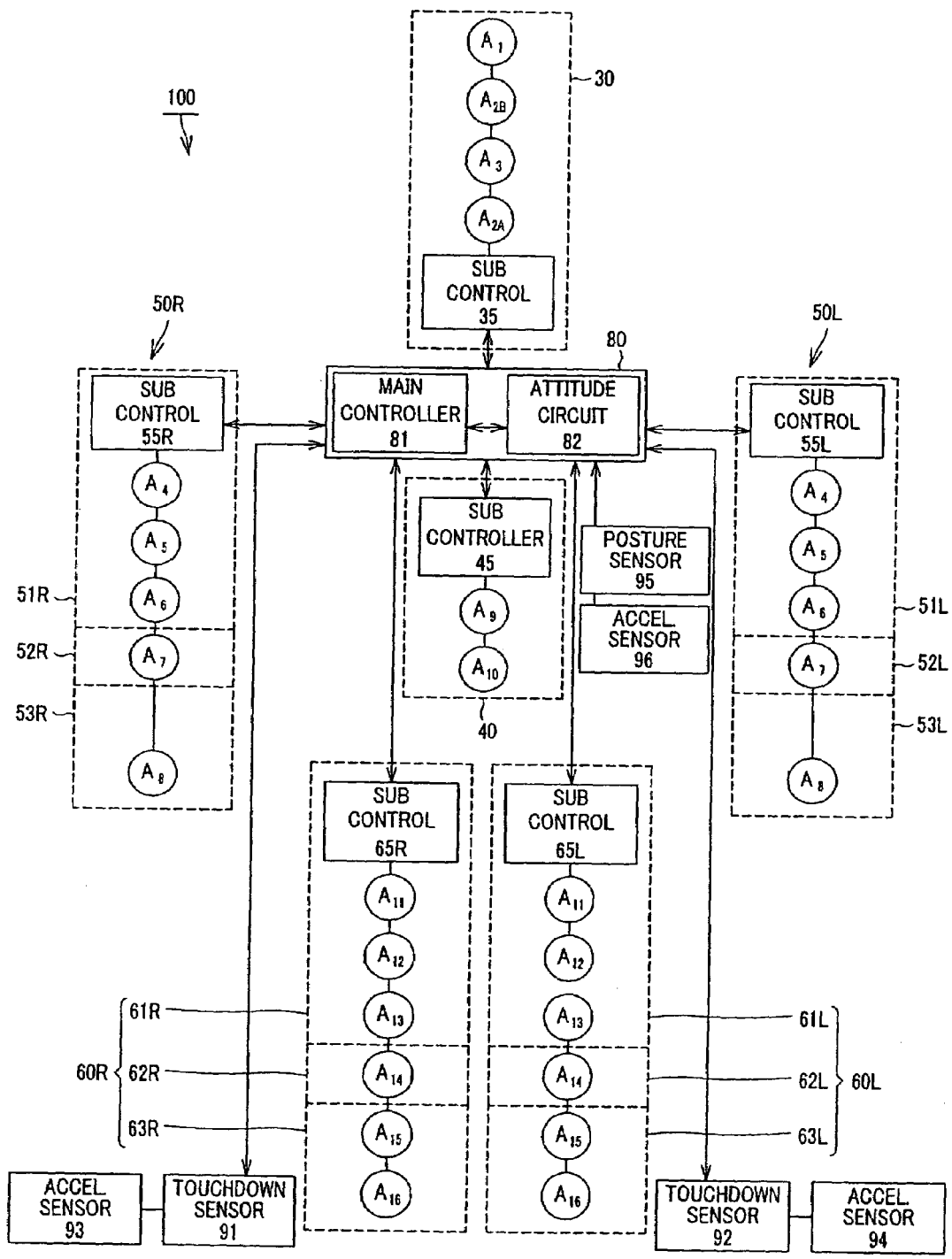
FIG. 4 schematically illustrates a control system used in the legged locomotion robot.

FIG. 4 schematically illustrates the construction of a control system adopted in the legged locomotion robot 100. As shown, the legged locomotion robot 100 includes working units 30, 40, 50R/L and 60R/L, which mimic the four limbs or extremities of a human being, and a main control unit 80 which provides an adaptive control for implementing a cooperation among the working units. Note that "R" and "L" are suffixed to a right-and left-hand things, respectively, for discrimination between the right and left sides.

The legged locomotion robot 100 is totally controlled by the main control unit 80. The main control unit 80 includes a main controller 81 including main circuit components (not shown) such as a CPU (central processing unit), memories, etc., and a peripheral circuit 82 including a power unit and interfaces (not shown) for transfer of data and commands to and from the components of the robot 100.

According to the present invention, the main control unit 80 may be located anywhere appropriate. Although the main control unit 80 is shown in FIG. 4 as being mounted in a trunk unit 40, it may be mounted in a head unit 30. Alternatively, the main control unit 80 may be located outside the legged locomotion robot 100 and wire or radio communication be made with the robot 100.

Each of the joints, namely, degrees of freedom, of the legged locomotion robot 100 in FIG. 3 is realized by a corresponding actuator. More specifically, the head unit 30 has disposed therein a neck joint yaw axis actuator $A_1$, neck joint pitch axis actuators $A_{2A}$ and $A_{2B}$ and neck joint roll axis actuator $A_3$, representing the neck joint yaw axis 1, first and second neck joint pitch axes 2A and 2B, and neck joint roll axis 3, respectively.

Also, the trunk unit 40 has disposed therein a trunk pitch axis actuator $A_9$ and trunk roll axis actuator $A_{10}$, representing the trunk pitch axis 9 and trunk roll axis 10, respectively.

Also, the arm unit 50R/L is subdivided into an upper arm unit 51R/L, elbow joint unit 52R/L and forearm unit 53R/L, and it has disposed therein a shoulder joint pitch axis actuator $A_4$, shoulder joint roll axis actuator $A_5$, upper arm yaw axis actuator $A_6$, elbow joint pitch axis actuator $A_7$ and wrist joint yaw axis actuator $A_8$, representing the shoulder joint pitch axis 4, shoulder joint roll axis 5, upper arm yaw axis 6, elbow joint pitch axis 7 and wrist joint yaw axis 8, respectively.

Also, the leg unit 60R/L is subdivided into a high unit 61R/L, knee unit 62R/L and shin (second thigh) unit 63R/L, and it has disposed therein a hip joint yaw axis actuator $A_{11}$, hip joint pitch axis actuator $A_{12}$, hip joint roll axis actuator $A_{13}$, knee joint pitch axis actuator $A_{14}$, ankle joint pitch axis actuator $A_{15}$ and ankle joint roll axis actuator $A_{16}$, representing the hip joint yaw axis 11, hip joint pitch axis 12, hip joint roll axis 13, knee joint pitch axis 14, ankle joint pitch axis 15 and ankle joint roll axis 16, respectively.

More preferably, the actuators $A_1$, $A_2$, $A_3$, . . . used at the joints can be formed each from a small AC servo actuator (as previously described) directly coupled to a gear and having the servo control system formed in one chip and which is built in a motor unit.

The working units including the head unit 30, trunk unit 40, arm units 50 and leg units 60 have sub controllers 35, 45, 55 and 65, respectively, for controlling the actuator driving.

The trunk 40 of the robot 100 has acceleration sensors 95 and attitude sensors 96 provided thereon. The acceleration sensors 95 are disposed in X-, Y- and Z-axial directions. With the acceleration sensors 95 disposed at the lumbar part of the robot 100, it is possible to set the hip or lumbar part where the mass is moved largely as a control-target point, directly measure a robot attitude and acceleration in that position, and control the robot 100 for a stable posture on the basis of a ZMP-based stability criterion.

Also, the legs 60R and 60L have touchdown sensors 91 and 92 and acceleration sensors 93 and 94, respectively. Each of the touchdown sensors 91 and 92 is formed from a pressure sensor, for example, attached to the foot sole and can detect, depending on the existence of a floor reaction force, whether or not the foot sole has touched the walking surface or floor. Also, the acceleration sensors 93 and 94 are disposed in at least the X- and Y-axial directions. The acceleration sensors 93 and 94 thus provided at the left and right feet, respectively, permit to directly detect, directly at the foot nearest to the ZMP position, parameters necessary for formulating a ZMP equilibrium equation, such as acceleration etc.

In case the acceleration sensor is provided only at the hip where the mass is moved largely, only the hip (lumbar part) is set as a control-target point while the status of the foot sole has to be calculated relatively on the basis of the result of calculation of the control-target point. The relation between the foot and walking surface should meet the following conditions:

(1) The walking surface will never move even if it is applied with any force and torque.

(2) The friction coefficient for a translation on the walking surface should be large enough not to cause any slipping.

On the other hand, in this embodiment, a reaction force sensor system (floor reaction force sensor or the like) to directly measure a ZMP and force is provided at the foot which is put into touch with the walking surface, and in addition there are disposed a local coordinate used for the purpose of control and an acceleration sensor to directly measure the local coordinate. As a result, it is possible to directly formulate a ZMP equilibrium equation for the foot nearest to the ZMP position and quickly implement a stricter control for a stable posture, not depending upon the aforementioned conditions. Therefore, it is possible to assure a stable walking (motion) of the robot even on a gravel road whose surface will move when applied with a force and torque, a thick-piled carpet or on a tile floor in a house, slippery with no sufficient friction coefficient for translation.

The main control unit 80 can dynamically correct a control target in response to an output from each of the sensors 91 to 93. More specifically, the main control unit 80 adaptively controls each of the sub controllers 35, 45, 55 and 65 to perform a whole-body motion pattern in which the upper limbs and trunk and lower limbs of the legged locomotion robot 100 will cooperate with each other.

In the whole-body motion of the robot 100, the main control unit 80 transfers, to the sub controllers 35, 45, 55 and 65, commands for setting a foot motion, ZMP trajectory, trunk motion, upper limb motion, hip height, etc. and for specifying motions corresponding to the settings. Each of the sub controllers 35, 45, . . . will interpret a command received from the main controller 81 to output a drive control signal to each of the actuators $A_1$, $A_2$, $A_3$, . . . The "ZMP" referred to herein is a point on a floor or walking surface where there exists no moment developed due to a floor reaction force developed when the robot 100 is walking. Also, the "ZMP trajectory" referred to herein means a trajectory along which a ZMP moves while the robot 100 is walking.

The robot 100 as the embodiment of the present invention is a humanoid-type entertainment robot capable of providing a dynamic, elegant performance. Such a performance can be implemented by small intelligent actuators designed for use in a robot and a real-time integrated adaptive motion control system.

With the above control system, it is possible to real-time create a gait pattern and stabilize foot and whole-body motions using the ZMP equation. Such a whole-body integrated control is provided by a software module called "locomotion engine". The locomotion engine receives a walking command, articulation of the upper body, and position and direction of the pelvis from another software module at every control cycle, and creates reference angles for all the articulations. Also, the locomotion engine stabilizes the whole-body motion with sensor values to adapt the robot to an unknown irregular walking surface and external force.

C. Motion Editing System

A dynamic, elegant motion performance can be implemented by the above-mentioned small intelligent actuators designed for use in a robot and real-time integrated adaptive motion control system. To support the motion control, the Inventors of the present invention developed a motion editing system which can run even in a general personal computer. In an environment offered by the motion editing system, even other people than the robot experts such as the engineers, designers and artists skilled in the robot field can create a motion performance of a robot.

The motion editing system according to the present invention includes two blocks: a motion editor to edit motions of the upper body of the robot 100 and entire robot 100, and a foot trajectory editor to edit a stabilized motion of the lower body.

An actual robot has installed therein a software module called "locomotion engine". The locomotion engine can real-time create a gait pattern by a whole-body integrated control, and stabilize the foot and whole-body motions using the ZMP equation as will be described in detail later. On the other hand, the motion editing system is designed to make a close collaboration with the actual robot.

With the motion editing system, the designer having created motions of the upper and lower bodies of the robot can make sure the entire robot motion before having the robot perform the created motions. Therefore, with such motion edition and creation, it is possible to implement an attractive robot application such as an up-tempo dance performance.

The motion editing system according to the present invention includes many user interfaces, and is suitable for use to create and edit various motions such as a stable bipedal walking, dance performance synchronous wit a music, etc. With the same features of gait pattern creation and posture stabilization as those installed in an actual robot adopted for creating the motions, it can create a motion which can accurately be performed on the actual robot.

Figure 5:
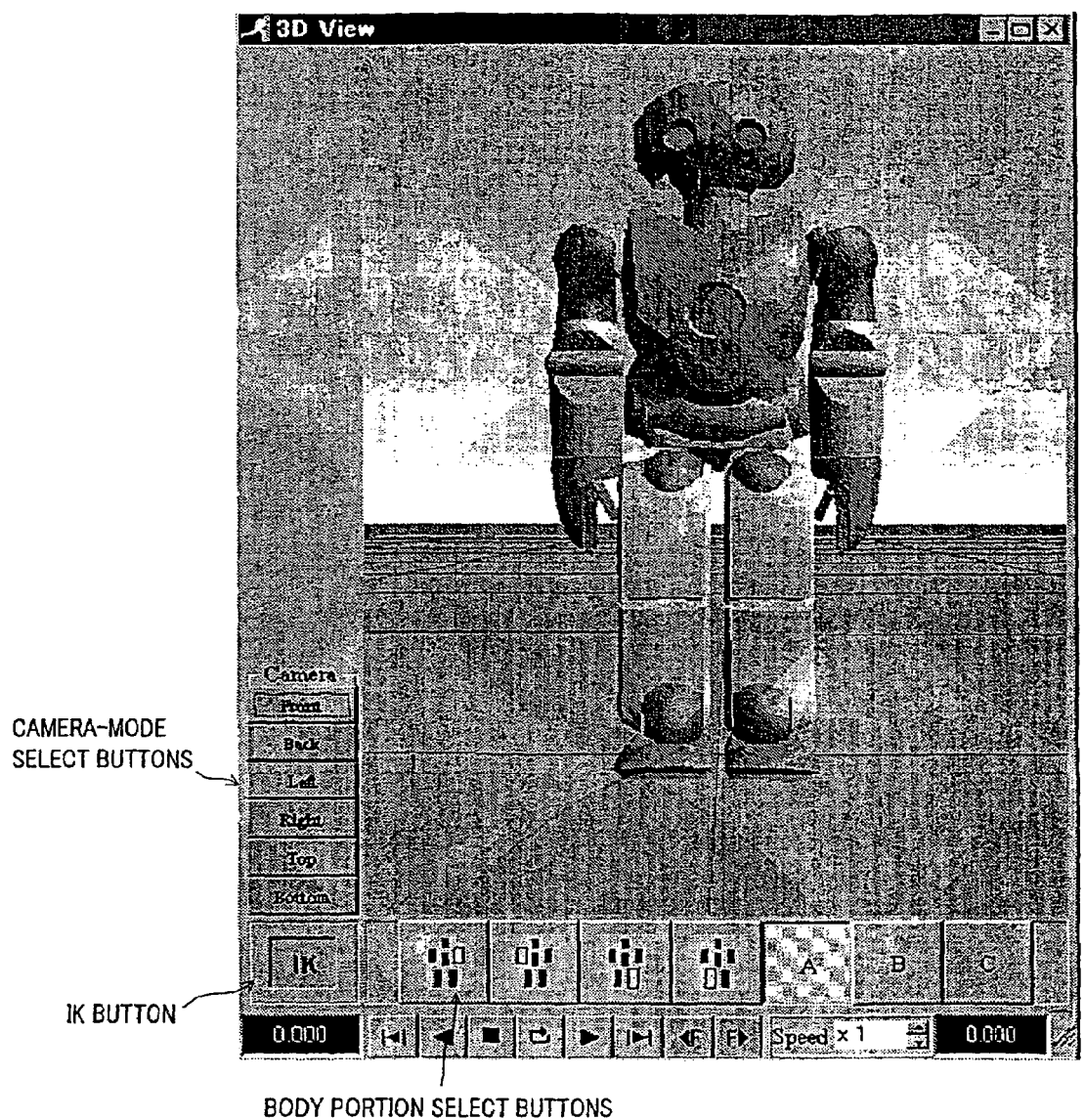
FIG. 5 shows an example of the configuration of an user interface screen on which the user can give a pose command to the legged locomotion robot according to the present while watching a three-dimensional (3D) animation character of the legged locomotion robot on the user interface screen.

For example, the motion editing system includes a user interface to designate a pose via a 3D animation character of the robot. FIG. 5 shows an example of the configuration of the user interface.

The operator can impart a desired motion to a portion designed on a 3D character being displayed on a 3D viewer screen shown in FIG. 5 by dragging the portion with a mouse.

As shown in FIG. 5, there are disposed along the left edge of the viewer screen camera-mode select buttons "Front", "Back", "Left", "Right", "Top" and "Bottom". By selectively pressing any of the buttons, the operator can designate a direction in which the 3D character is to be viewed (displayed).

Also, body portion select buttons are disposed along the lower edge of the viewer screen. By selectively pressing any of these body portion select buttons, the operator can designate a body portion to which a motion is to be imparted. In the illustrated example, the body portion select buttons include a left arm select button, right arm select button, right leg select button and left leg select button in this order from the left. Also, there are provided buttons marked "A", "B" and "C", respectively, on their tops. These buttons are user-programmable ones, and the operator can use them as shortcut buttons for simultaneous designation of two or more body portions.

Figure 6:
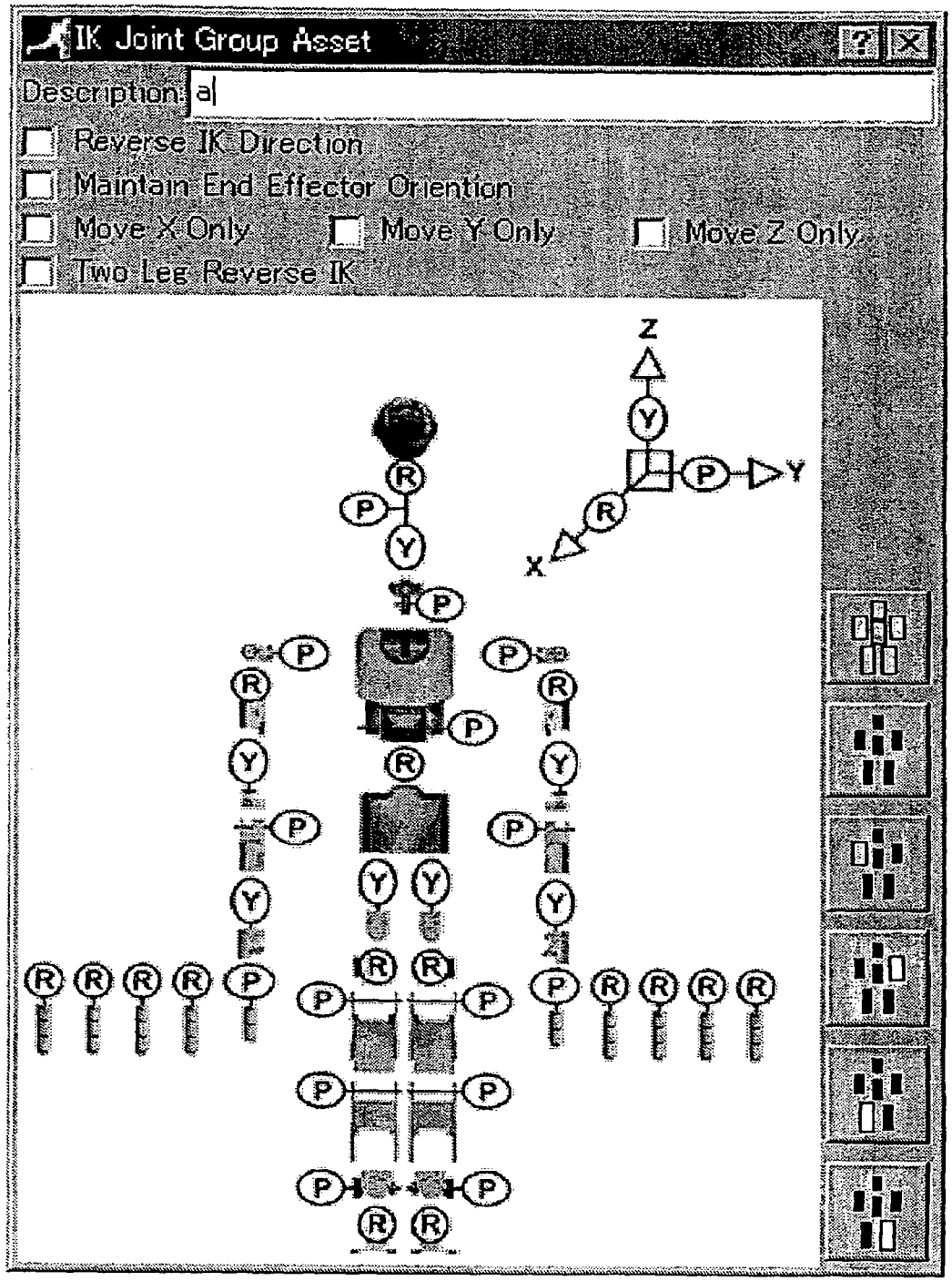
FIG. 6 shows an example of an IK articulation grouping window.

Also, along the lower left edge of the viewer screen, there is disposed an IK (inverse kinematics) button which provides, when selected, a display of an IK articulation grouping window as shown in FIG. 6.

In the IK articulation grouping window, there are depicted degrees of freedom of the robot body portions. On the IK articulation grouping window, the operator can designate, by directly clicking, a body portion whose pose is to be changed. Alternatively, the operator can select portions to be grouped by the use of corresponding body portions select buttons disposed along the right edge of the screen.

Also, in the upper portion of the above window, there is disposed a check box for designating the attribute of an IK articulation group.

By checking "Maintain End Effector Orientation", it is possible to maintain a posture of a foot sole when manipulating a foot.

Also, by checking "Move X/Move Y/Move Z", it is possible to limit, to each of the X, Y and Z directions, the direction in which a designed body portion of the 3D character is manipulated.

Figure 7:
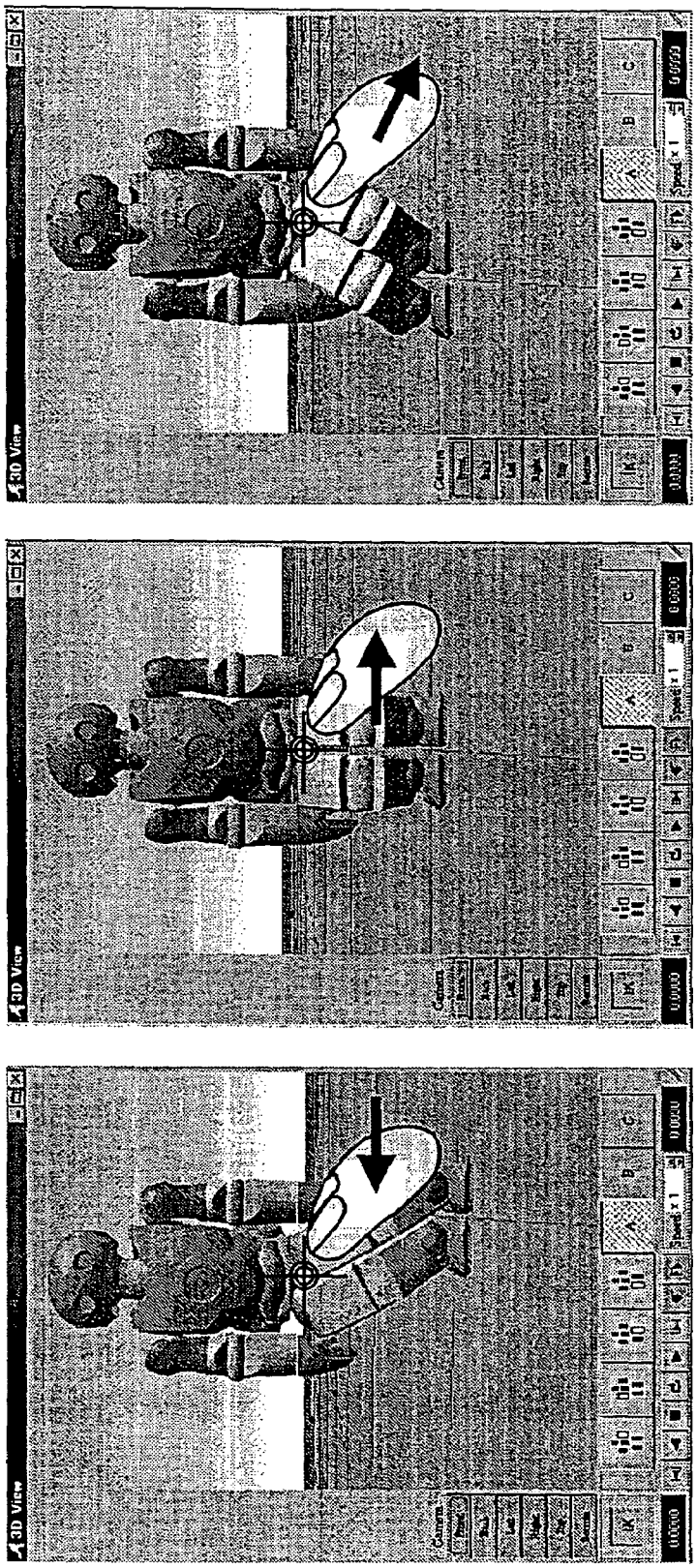
FIG. 7 shows how the user can change the pose of the robot from one to another while watching the robot after designating both the right and left legs as objects whose poses are to be controlled.

A pose can be changed by designating a body portion whose pose is to be changed, then restoring the 3D viewer screen shown in FIG. 5 and dragging the body portion designed on the 3D character with the mouse. FIG. 7 shows how the pose of the robot is changed from one to another while watching the 3D character after designating both the right and left feet as objects whose poses are to be changed. In this case, the operator can scan the hip joint vertically and horizontally over the screen by applying the cursor to near the hip joint portion, and clipping this portion with the mouse. In the example shown in FIG. 7, only the hip position and posture are changed without changing those of the foot sole correspondingly to the operator's operation.

The inverse kinematics-based pose designation is such that after a body portion whose pose is to be changed is designated, a motion is imparted to a designated portion of a 3D character simulating the actual robot. The designated portion can be manipulated using a function such as mouse dragging or the like. After the designated portion is manipulated, the displacement of each articulation for defining a pose on the screen is calculated based on the IK (inverse kinematics).

Also, a pose can be inputted by determining an angle of displacement of each joint axis from a pose designated via the 3D animation character of the robot on the basis of the inverse kinematics as above, and also by inputting the angle of displacement of each joint axis directly.

Figure 8:
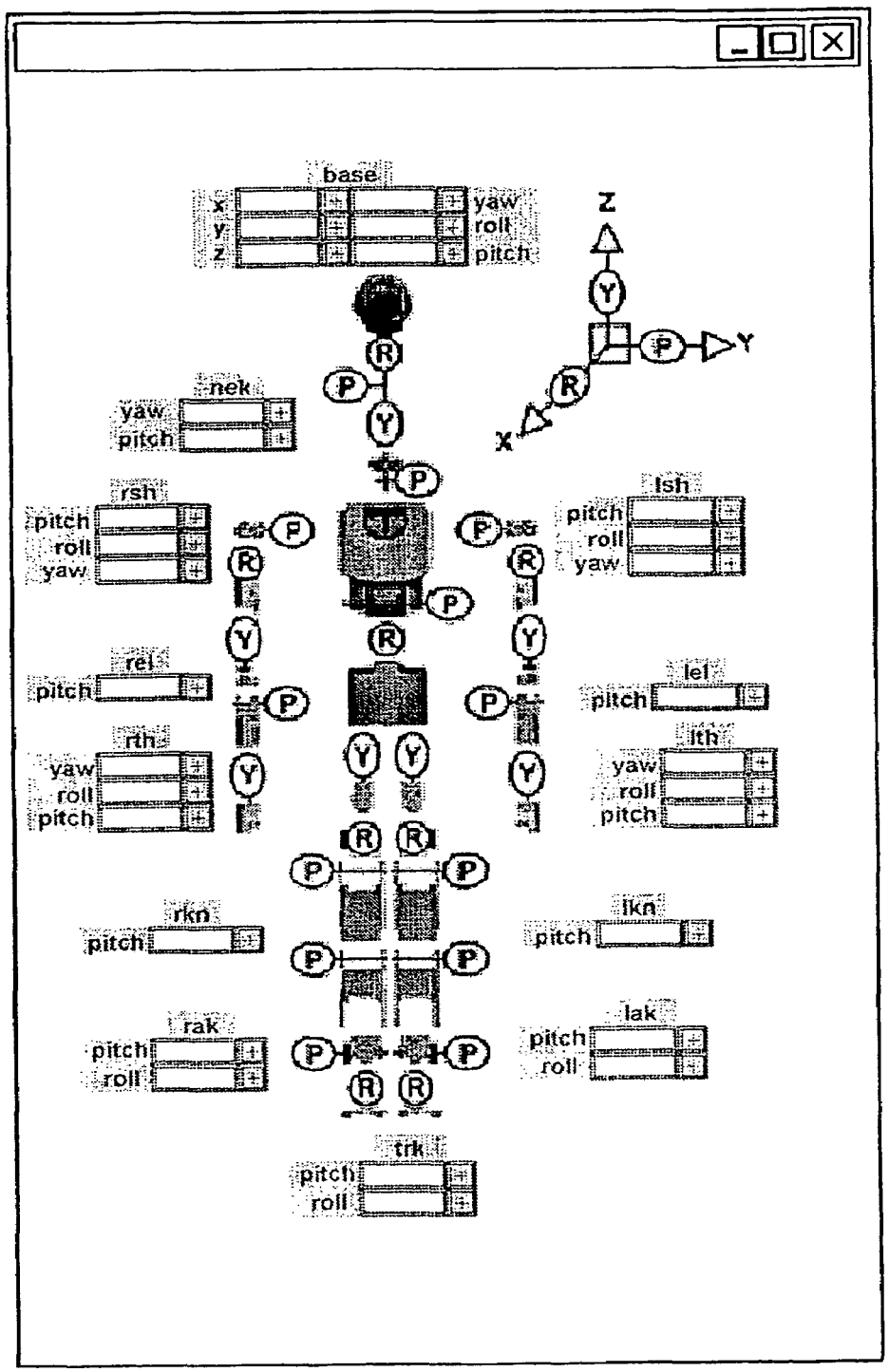
FIG. 8 shows an example of a screen on which the user can designate an angle at which joint axis is to be tilted for defining a user-desired pose of the robot.

With the latter direct inputting method, it is possible to designate a pose using an input screen as shown in FIG. 8 for example. In the screen shown in FIG. 8, there is disposed an articulation input box by the side of each joint of the robot, namely, degree of freedom. The operator can place the cursor in the articulation input box near a desired joint by moving the mouse, and give a desired value using a keyboard. Also, the operator can increment the existing input value by clicking the "+" button located at the right end of the input box. A new value written to the input box is stored as a pose being currently taken. Also, a calculated value of an articulation determined based on the IK-based pose designation method is reflected in the input box in the articulation designating screen shown in FIG. 8.

Note that as the direct input method, a displacement of each articulation detected by a motion capture or direct teaching on the actual robot can be used as input data in addition to the user's manual entry on the input screen as shown in FIG. 8.

Figure 9:
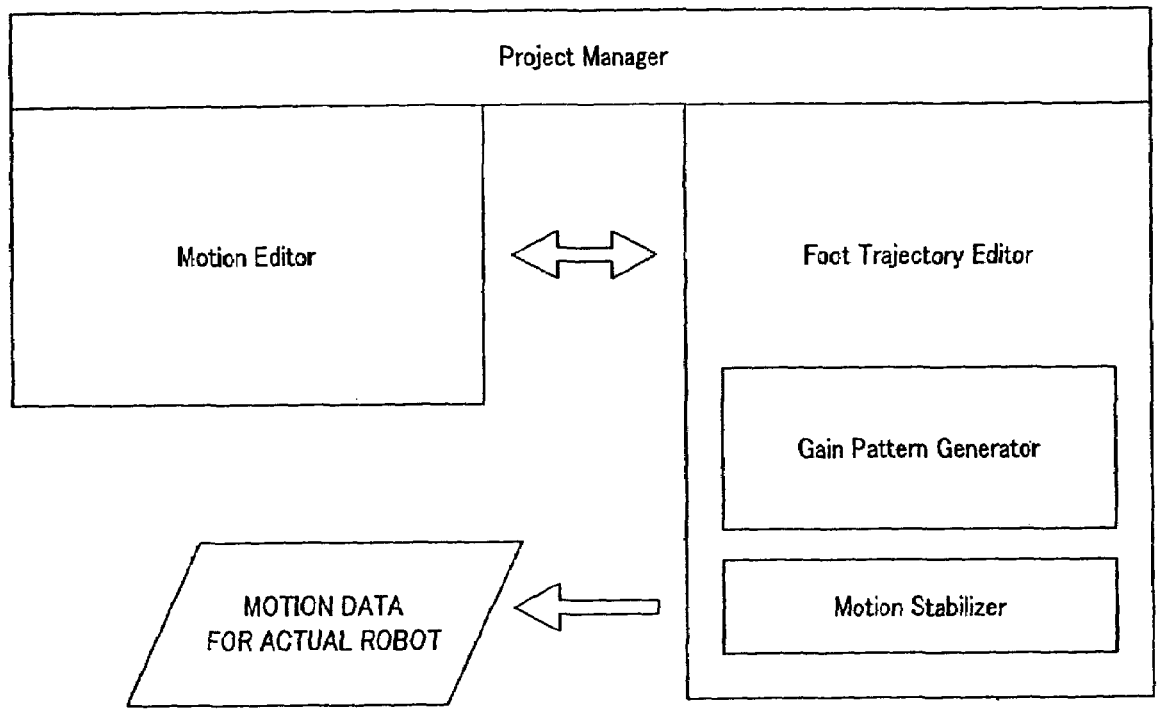
FIG. 9 schematically shows the functional composition of a motion editing system according to one embodiment of the present invention.

FIG. 9 schematically shows the functional composition of the motion editing system according to one embodiment of the present invention.

The motion editing system includes two blocks: a motion editor to edit motions of the upper body and whole body of the robot 100, and a foot trajectory editor to edit a stabilized motion of the lower body.

The foot trajectory editor has two main functions for generating motion data for controlling the actual robot. One of the functions is a gait pattern generator and the other is a motion stabilizer.

Figure 10:
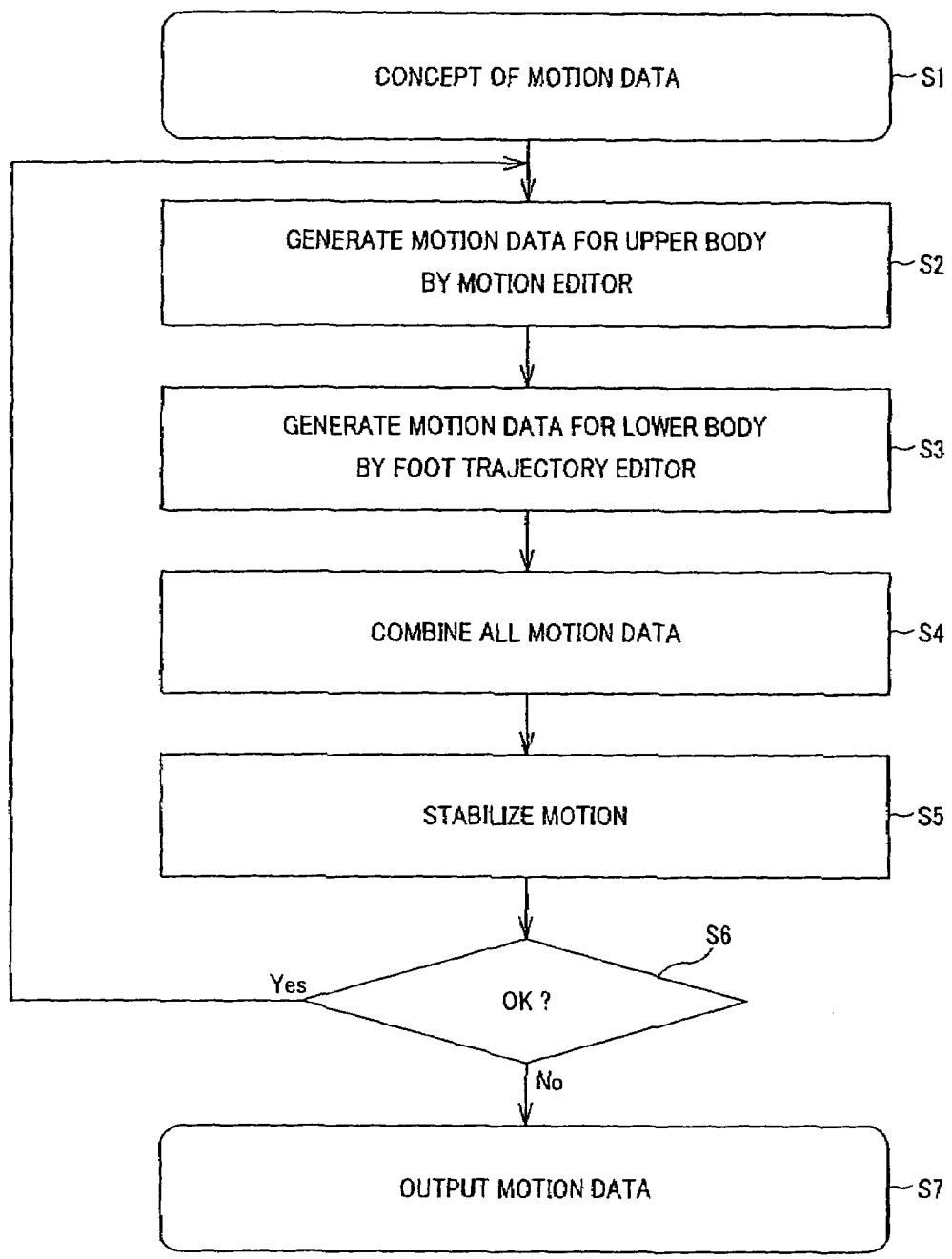
FIG. 10 shows a flow of operations made in creating of motions of the robot by the motion editing system according to the present invention.

FIG. 10 shows a flow of operations made in creating of motions of the actual robot by the aforementioned motion editing system.

When a concept of a motion design is formed (in step S1), the motion editor can be started up via a project manager (in step S2).

With the motion editor, it is possible to motions of the upper body and whole body of the actual robot by setting each pose and consecutively entering transitions from one pose to another. It should be noted that to create and correct an attractive pose of the actual robot, both forward and inverse kinematics are used.

The created motion is performed on the 3D window screen, and the user can check the performance.

Next, the gait pattern generator in the foot trajectory editor creates a gait pattern as a motion of the lower body during bipedal walking (step S3).

Then, the user operates the motion editor to generate upper-body motion data, and also the foot trajectory editor to generate lower-body motion data. Such generated motion data are combined together (in step S4).

The motion stabilizer evaluates a whole-body motion derived from the combination of the upper- and lower-body motion data depending upon whether the posture can be stabilized or the motion data is applicable to control of the motion of the actual robot (step S5). When passing the evaluation (in step S6), the motion data is outputted (in step S7).

The results of edition by the motion editing system are stored as a motion file in a predetermined format. By installing the motion file in the legged locomotion robot, the motion can be performed on the actual robot.

D. Motion Editor

D-1. Edition on Time Line

The motion editor edits a motion by interpolating or otherwise processing an inter-pose motion according a pose of the robot, entered by the operator. At this time, two or more poses can be combined time-serially on the time line and also poses edited for body portions, respectively, can be combined in parallel with each other.

The time line includes a plurality of function buttons and a control function to manipulate time and a plurality of tracks. The "plurality of tracks" referred to herein includes a motion track, joint limit error track, audio track, etc. The time line may be formed by assigning motions of different portions of the robot to different motion tracks, respectively (as will be described in detail later; also see FIGS. 11 and 12). The tracks are related to different groups of robot body portions such as neck joint group, right-arm joint group and left-arm joint group. In case more than two tracks are defined for the motion of the same joint, higher-order tracks are given higher priorities. In the 3D window screen shown in FIG. 5, there are displayed ones, given higher priorities, of all the tracks and simulated using the motion data.

Figure 11:
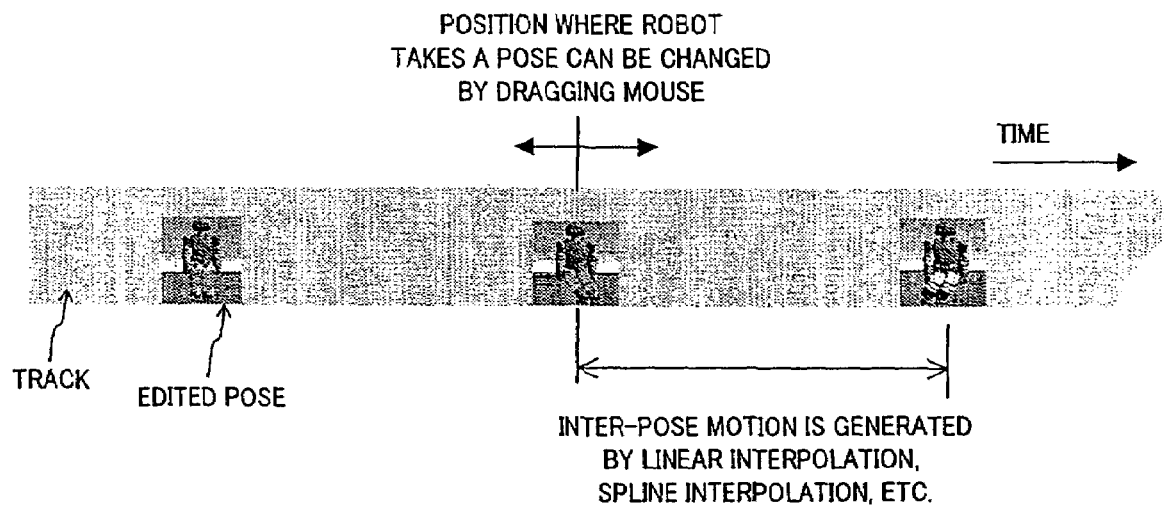
FIG. 11 shows a time-serial sequence of a plurality of poses on a track.

Poses designed on the 3D viewer screen as shown in FIG. 5 and determined based on the inverse kinematics, or those designed on the screen on which an angle of displacement of articulation is entered, as shown in FIG. 8, are consecutively disposed on the track. FIG. 11 shows a time-serial sequence of a plurality of poses disposed on a track.

The horizontal axis of a track corresponds to the time base. Icons representing created motions are sequentially disposed at default intervals on a track. By dragging an icon horizontally on the track, it is possible to slide a time when the pose is performed. Adjacent poses are interpolated with the technique such as a linear interpolation or spline interpolation, for example, to provide a motion.

On one track, there are manipulated only poses of the same designated body portion. That is, a track is prepared for each IK articulation group. For example, if a pose of the left foot as a designated body portion is entered while a motion formed from a pose of the right arm as a designated body portion is being designated on a track (or if any other portion than the right arm is designed or any other portion is designed along with the right arm), it will be registered on another track.

Figure 12:
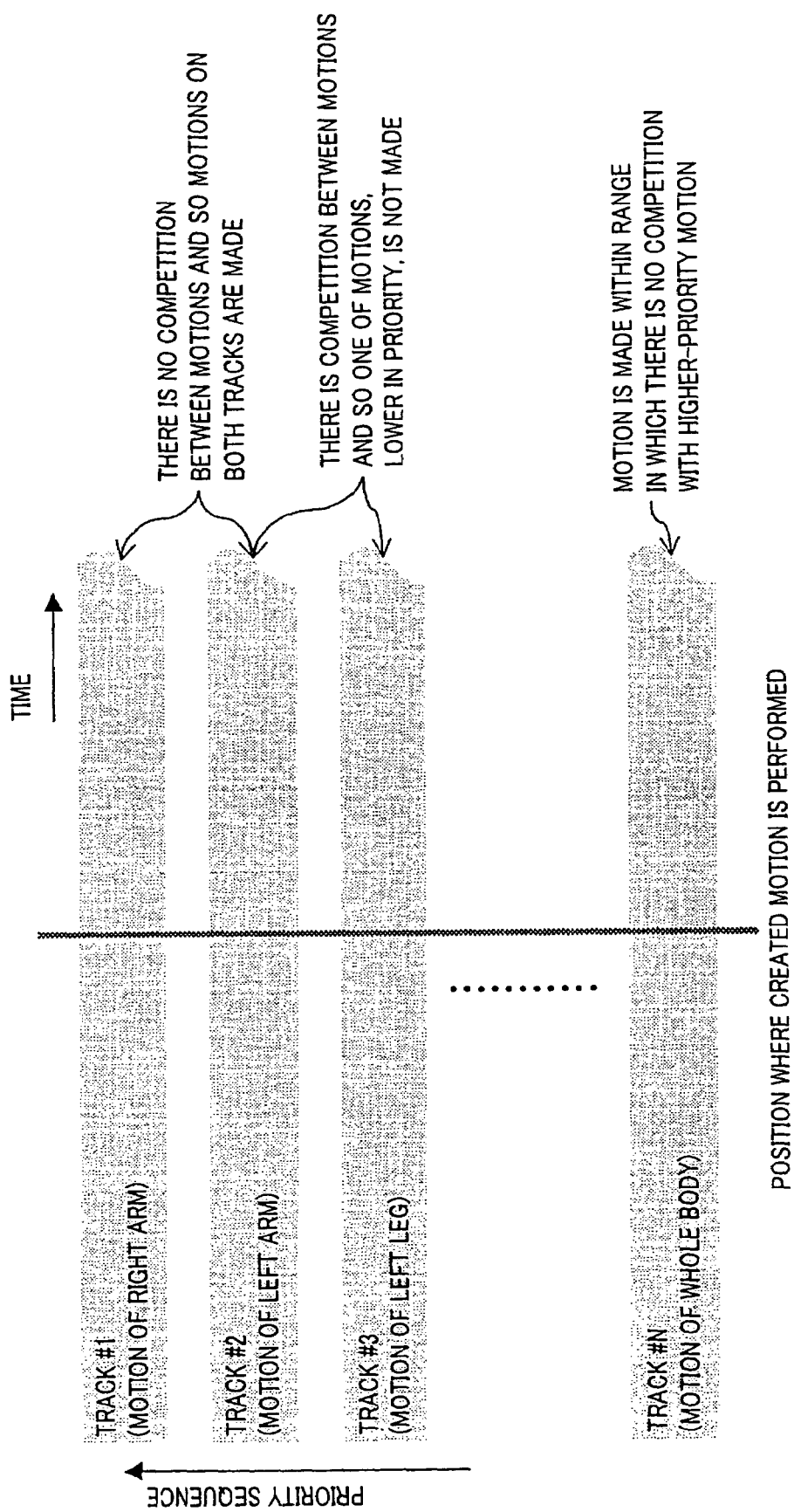
FIG. 12 shows tracks disposed for IK articulation groups, respectively.

FIG. 12 shows tracks disposed for IK articulation groups, respectively. Each of the tracks covers a motion formed from a pose defined by a corresponding IK articulation group. In the example shown in FIG. 12, there are disposed tracks for the right arm, left leg, right leg, . . . in this order from above.

The tracks are disposed in the order of their priorities. By reproducing a motion after creating poses in the use of a track, namely, in the unit of an IK articulation group, the motion is performed on the actual robot.

In the example shown in FIG. 12, the pose of the right arm to which a high priority is given is preferentially performed. Next, the pose of the left leg will be performed. Since there is no interference between the right arm and left leg on the robot hardware, the pose of the left leg will be performed generally as it is.

Also, in case there continuously exist more tracks for the left leg as an IK articulation group, since their priority will conflict with a higher-priority track, so the pose on this track will not be performed when the motion of the left leg is reproduced.

Also, in case there are continuous tracks for the whole body as designated portion, the pose of the whole body will be performed within a range in which there will be no conflict with the high-priority tracks for the right arm, left leg, etc.

In a system allowing to edit poses in the units of a body unit on each track, it is regarded as preferable for the efficiency of the edition to assign higher-priority tracks to edition of a pose of a specific body portion while assigning lower-priority tracks to edition of poses of a combination of relatively large body portions such as the upper body, lower body, whole body, etc.

D-2. Inter-pose Interpolation

In one modes of edition using the motion editor, a pose is first created, and an interpolation is made between poses thus created. By setting poses on each track while interpolating the poses, it is possible to simply create many different motions. With this technique, a motion can easily be created even when an articulation depicts a complicated trajectory.

The motion editor according to this embodiment of the present invention has some interpolating functions such as a linear interpolation, polynomial interpolation, cubic splice interpolation, etc. With these interpolation functions, individual poses discretely edited can be smoothly joined to successive single motions.

A pose is formed by each of all the joints of the actual robot. However, it is only an articulation enabled on the motion track that will have influence on an actual motion.

D-3. Articulation Limit and Articulation Speed Limit

In case it is tried to implement a complicated articulation trajectory created on the time line, an articulation limit and articulation speed limit on the actual robot are broken in some cases. In a design of a motion, it is important to detect such limits precisely without breaking them.

The motion editor according the embodiment of the present invention has an articulation limit and articulation speed limit checking functions capable of visually feeding back, along the time line, all time points when such limits have been broken. Limit values for all the articulation limits are stored in a limit setting file.

D-4. Mixing of Motions

It is desired in some cases to create a series of motions formed from a smooth combination of motions including from a motion at a time to a motion at another time.

The motion editor according to the embodiment of the present invention has various motion blending functions for the above purpose. Of these motion blending functions, a linear blending function is applied for combination of overlapping portions of two motions while linearly increasing or decreasing the mixing ratio. Also, the motion editor has a mixing function to smoothly join not only positions but also speeds and accelerations at the boundary of two motions.

D-5. Posture Edition

The motion editor according to the embodiment of the present invention has two types of functions to copy an articulation value. One of the functions is a mirror copying, and the other is a symmetrical copying.

With the mirror copying function, it is possible to copy symmetrical articulation values of a selected joint. For example, when the right arm is selected, the angle of each joint of the right arm is copied to a corresponding joint of the left arm.

Also, the symmetrical copying function is the same function as the mirror copying function except for copying in both directions. For example, when both the right and left arms are selected, articulation values of the arms are swapped with each other.

D-6. Joint Editor

In the joint editor window, there are displayed almost all joints including the fingers and their articulations (see FIG. 8). There are two methods of editing articulation values. One of them is to directly input an articulation value, and the other is to input an articulation value using a pop-up slider. In the latter case, simultaneous display of a plurality of sliders permits to simplify the pose edition. An angle limit breaking can also be displayed in the joint edition window.

D-7. Direct Editing

Figure 13:
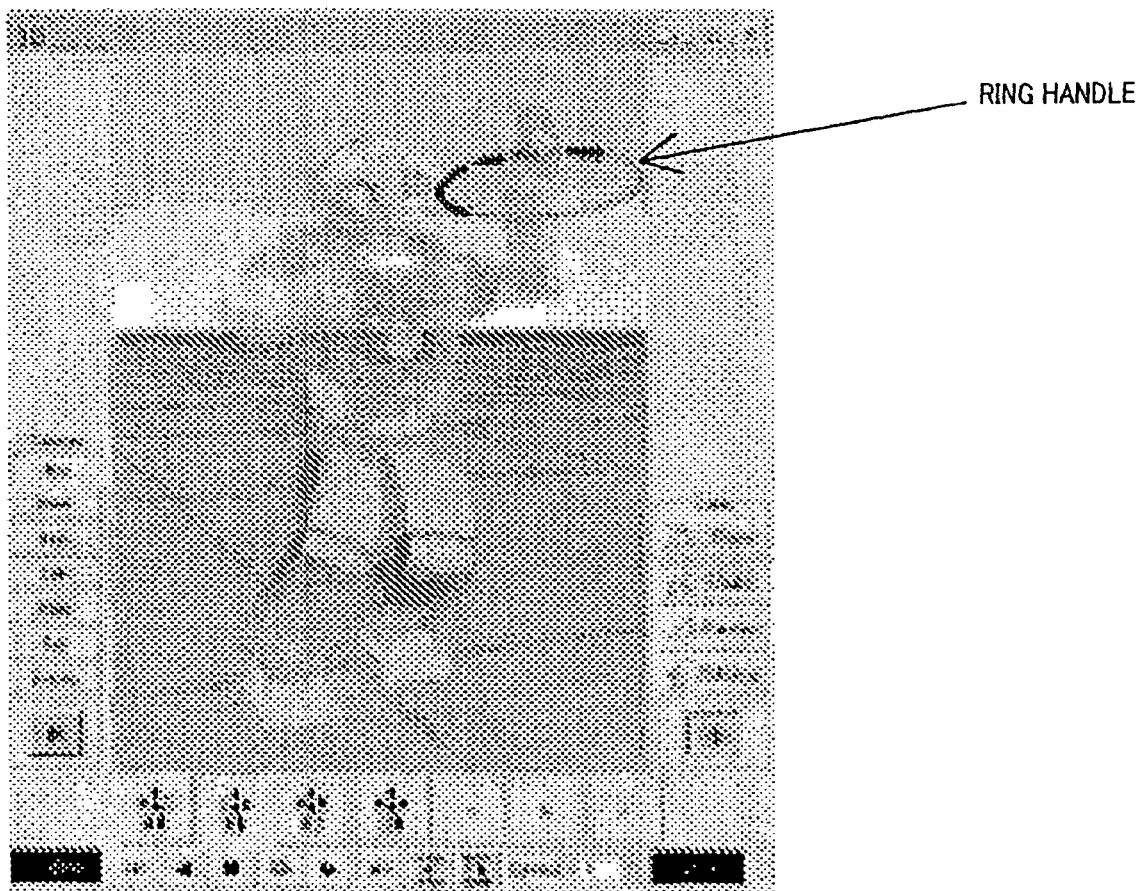
FIG. 13 shows a screen of a pose edition mode of a motion editor.

In the pose edition mode of the motion editor, an articulation and robot posture can directly be corrected with manipulations on the 3D viewer screen as shown in FIG. 5. When a joint is selected, the degree of freedom as to the joint is displayed along with a graphic ring-shaped handle (see FIG. 13). Just by clicking and dragging the mouse with the cursor placed on the ring handle, a pose can be edited.

Figure 14:
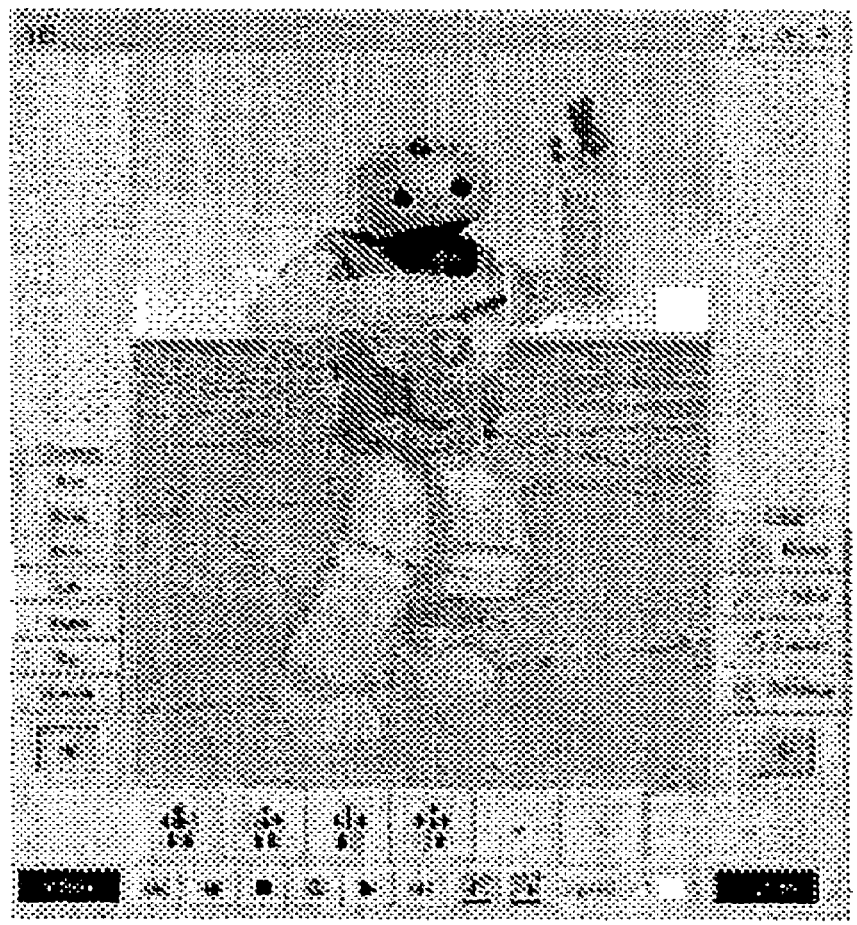
FIG. 14 shows a screen of an IK edition mode of the monitor editor.

Also, in the IK edition mode, the end point position and direction of a robot limb and linkage, simulated on the screen can be manipulated in the 3D viewer window (as in FIG. 14). A pose formed with these operations using the IK and pose edition mode is displayed on the time line (see FIG. 12).

D-8. Features of the 3D Viewer

On the 3D viewer screen, an articulation can directly be entered and a motion can be played back for viewing. That is, in the time line window, a start point and end point of a playback are set and the playback speed is adjusted.

Also on the 3D viewer, there are disposed the camera-mode select buttons. Some camera views can be stored along with the location, point of regard and field of view of the camera at that time. For example, in case the point of regard is set on the right hand of the robot, when a motion is reproduced, the right hand is always set at the center of the 3D viewer screen. With this function, it is possible to view a created or edited motion more exquisitely.

An edited pose and motion are stored as a pose data file and motion data file, respectively, as resources, collected as a library and reutilized over a plurality of projects.

E. Foot Trajectory Editor

E-1. Gait Pattern Generator and Motion Stabilizer

The foot trajectory editor is featured in one aspect thereof by that it has the same gait pattern generator and real-time motion stabilizer as those installed in the actual robot.

The gait pattern generator creates a series of trajectories representing positions and directions of the feet of the right and left legs on the basis of a walking command sequence and walking parameter sequence. A trajectory is represented as a trajectory of steps of both the feet the step cycle. The "walking parameter" referred to herein includes a step length, step cycle or some other parameters.

The real-time motion stabilizer receives a gait pattern, movement of the pelvis of the upper body and movement of the joints at every control cycle, and calculates a corresponding whole-body motion which implements a stable bipedal walking on the basis of the ZMP stability criterion.

With the above functions of the foot trajectory editor, it is possible to view the same motion as that performed on the actual robot and verify the feasibility of the motion in the motion editing system before testing the motion on the actual robot.

When motion data has been specified, the motion editing system has only to transfer a sequence of walking commands, pelvis key frame and upper-body motion to the control system for the control system itself can determine a whole-body motion in detail. The design concept for such a cooperation between the control system and motion editing system permits to reduce the size of motion data to be loaded to the robot fort the purpose of data transfer.

E-2. Design of Gait Pattern

A gait pattern can be designed by setting walking parameters for each step. For example, various steps such as walking step, dancing step and the like are formed based on appropriate walking parameters.

The gait pattern generator according to the embodiment of the present invention can deal with the walking parameters given below by way of example:

(1) Step cycle ω (in sec/step): Time for one step (2) Ratio of weight support on right and left feet per step d (in %)

Figure 15:
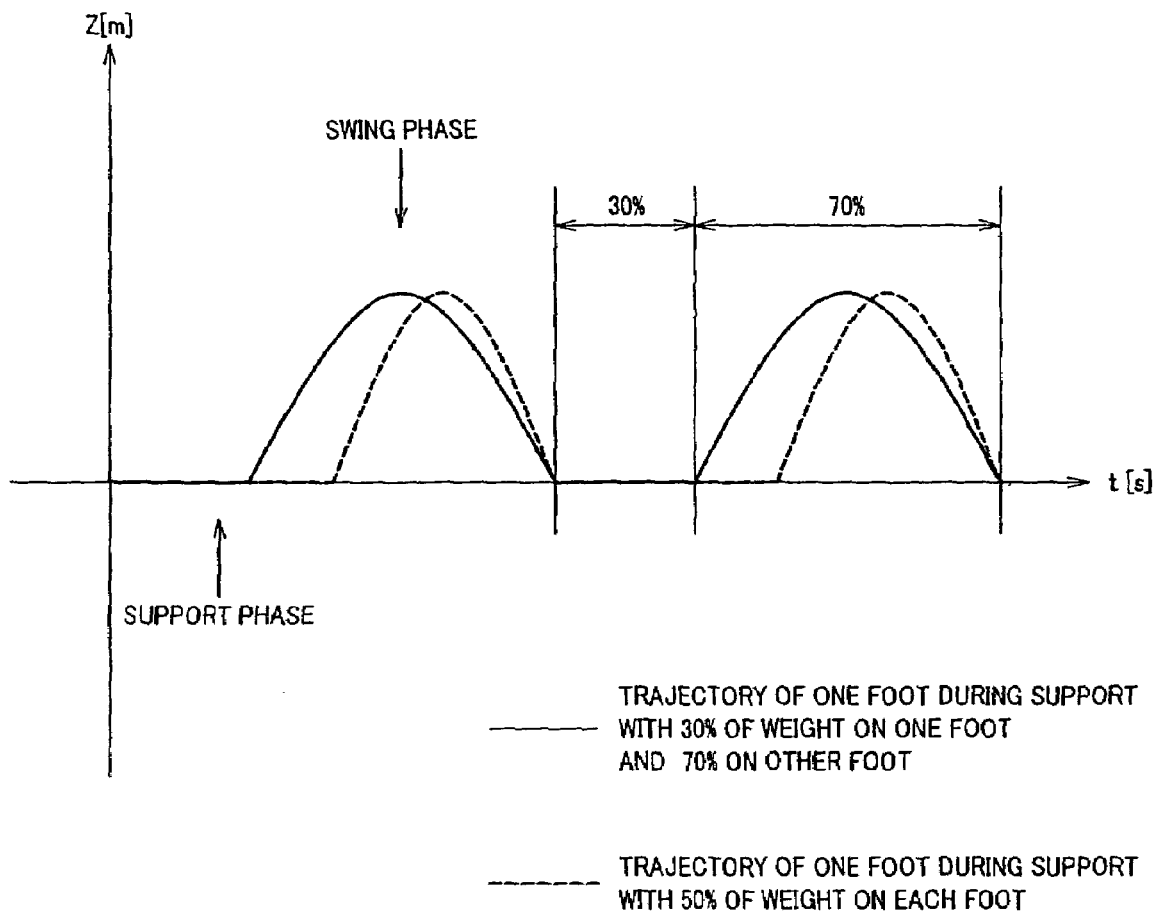
FIG. 15 graphically illustrates different trajectories of one foot of the robot when the ratio in applied weight between the feet is changed.

FIG. 15 shows different trajectories of one foot of the robot when the ratio in applied weight between the feet is changed.

(3) Front-rear step length x (in m): Length of x-directional step (4) Right-left step length y (in m): Length of y-directional step (5) Turning angle θ (in deg.)

Figure 16:
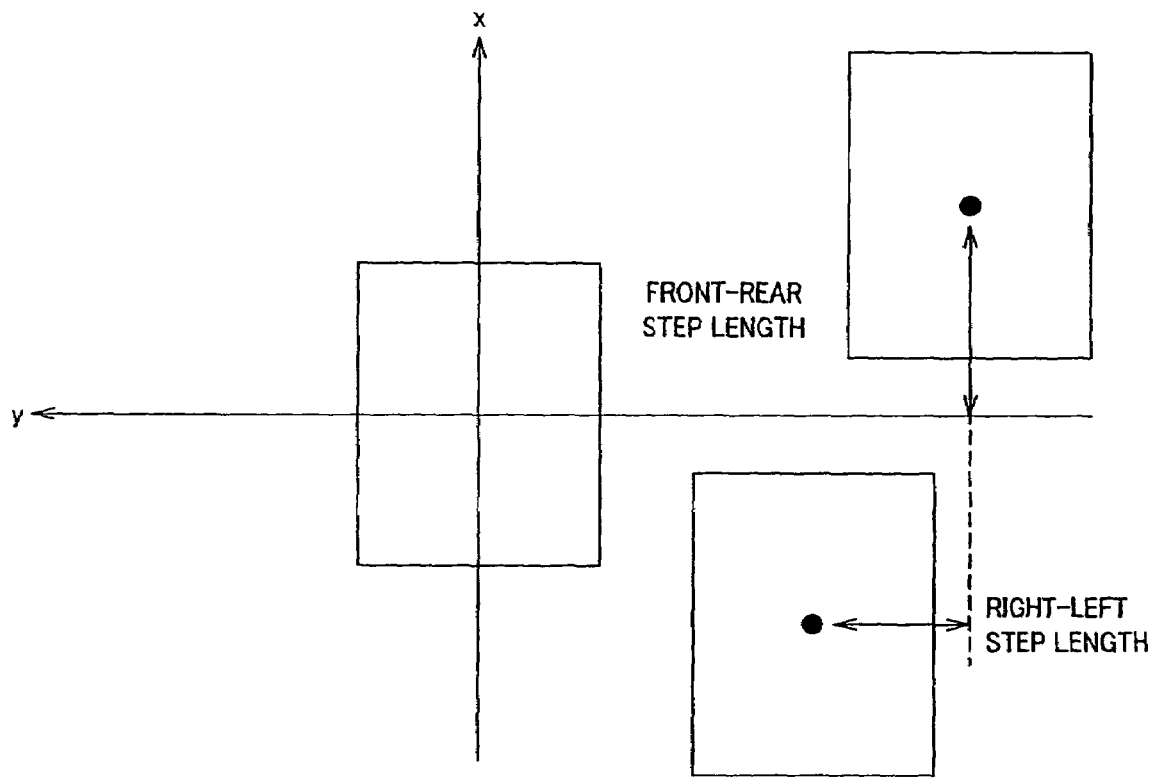
FIG. 16 explains a front-rear step length and right-left step length.
Figure 17:
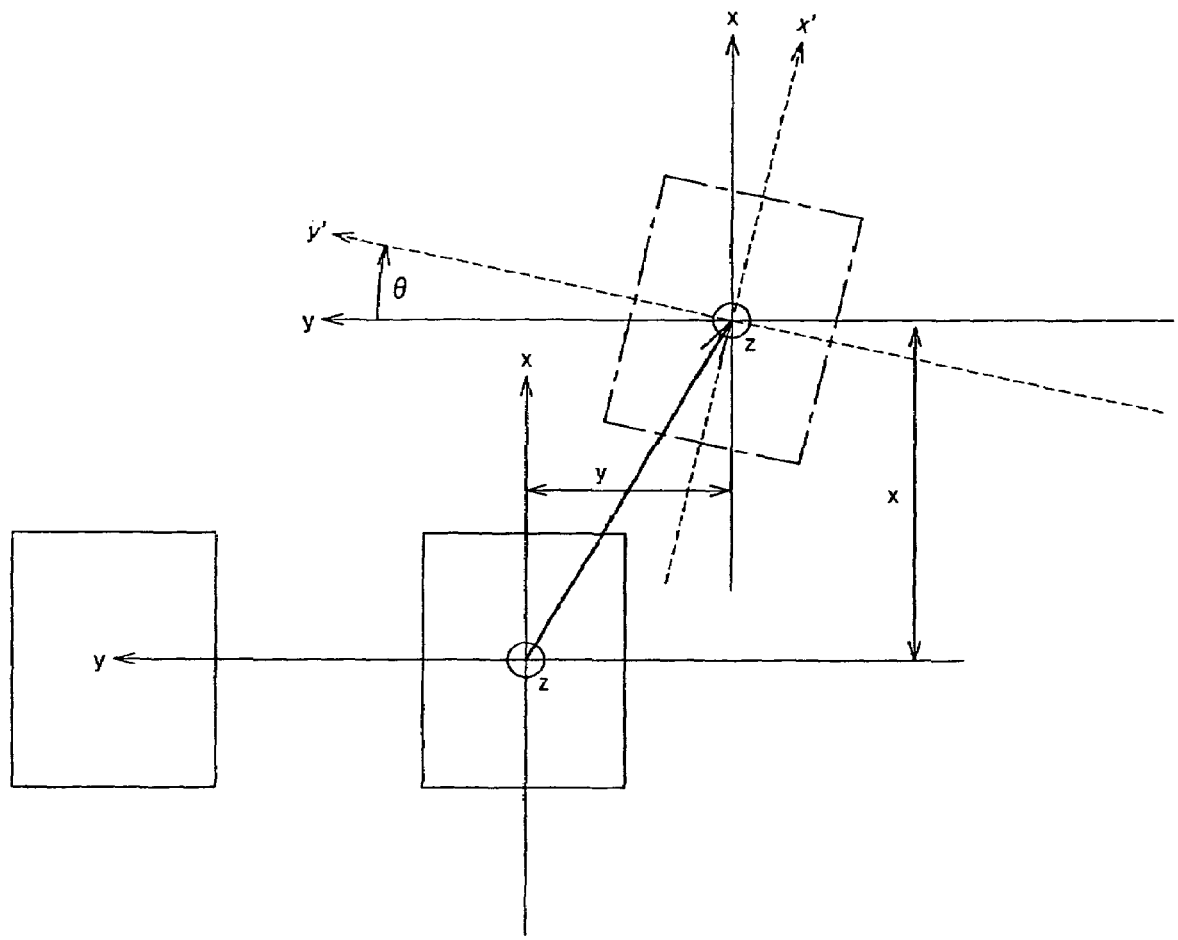
FIG. 17 explains a relation among a front-rear step length $x$, right-left step length $y$ and turning angle $\theta$.

Note here that the "one step" referred to herein means an motion made since the foot sole of one leg touches the walking surface until the foot sole of the other leg touches the walking surface. Also, the "step length" is a distance over which the robot moves by one step. On the assumption that the front-rear step length is x, right-left step length is y (see FIG. 16) and turning angle is θ, a motion takes place as shown in FIG. 17.

(6) Foot-down height l (in m):

Height of the sole of swing foot from the walking surface to a level at which the foot sole is placed (on an object, for example)

Figure 18:
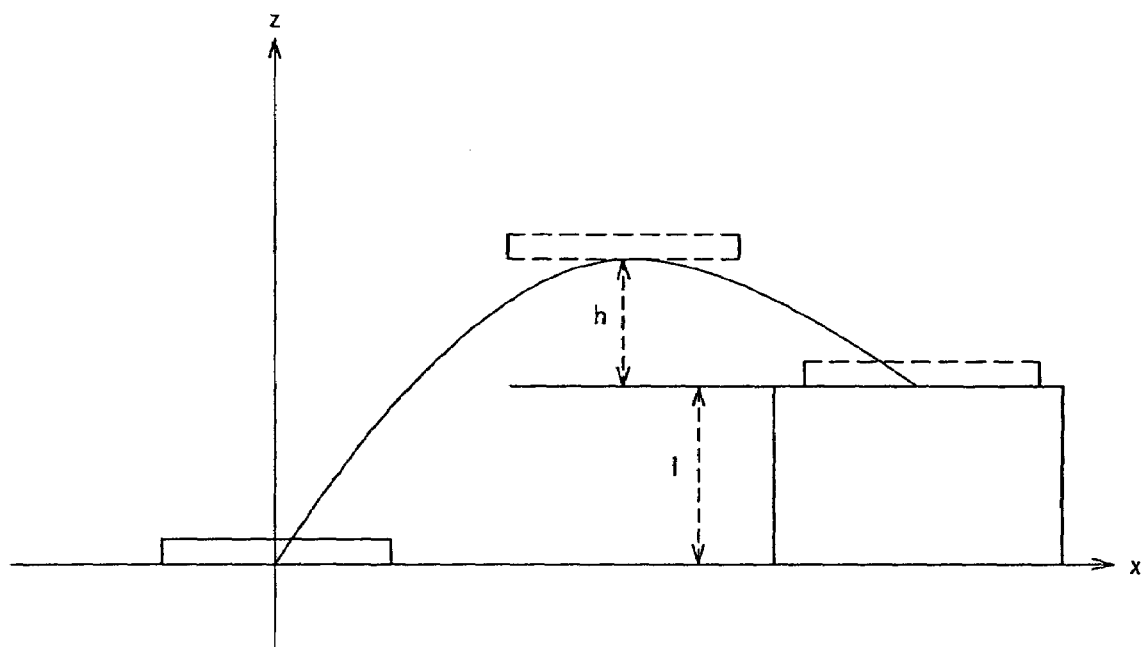
FIG. 18 explains a foot-down height and leg-up height.

(7) Leg-up height h (in m): Height of the foot sole when the leg is raised FIG. 18 shows a foot-down height l and leg-up height h for making one step.

(8) Designation of swing foot [Right foot or Left foot]: Designation of a foot to be idled (9) Designation of support-foot maintenance [True or False]

(10) Designation of ZMP trajectory pass point [$ZMP_1(t_1, x_1, y_1, z_1)$, $ZMP_2(t_2, x_2, y_2, z_2)$, ..., $ZMP_n(t_n, x_n, y_n, z_n)$]:

More than one point by which ZMP trajectory taking the support-foot sole coordinate system as a reference passes at arbitrary times $t_1, t_2, \ldots, t_n$ within a time since the foot sole leaves the walking surface and touches again the walking surface

(11) Designation of point ZMP trajectory passes by [True or False]:

Designation of pass-by of a point represented by ZMP trajectory pass point

(12) Designation of stop [True or False]:

When the designation is True, the ZMP trajectory is converged to the intermediate point between both the foot soles.

Figure 19:
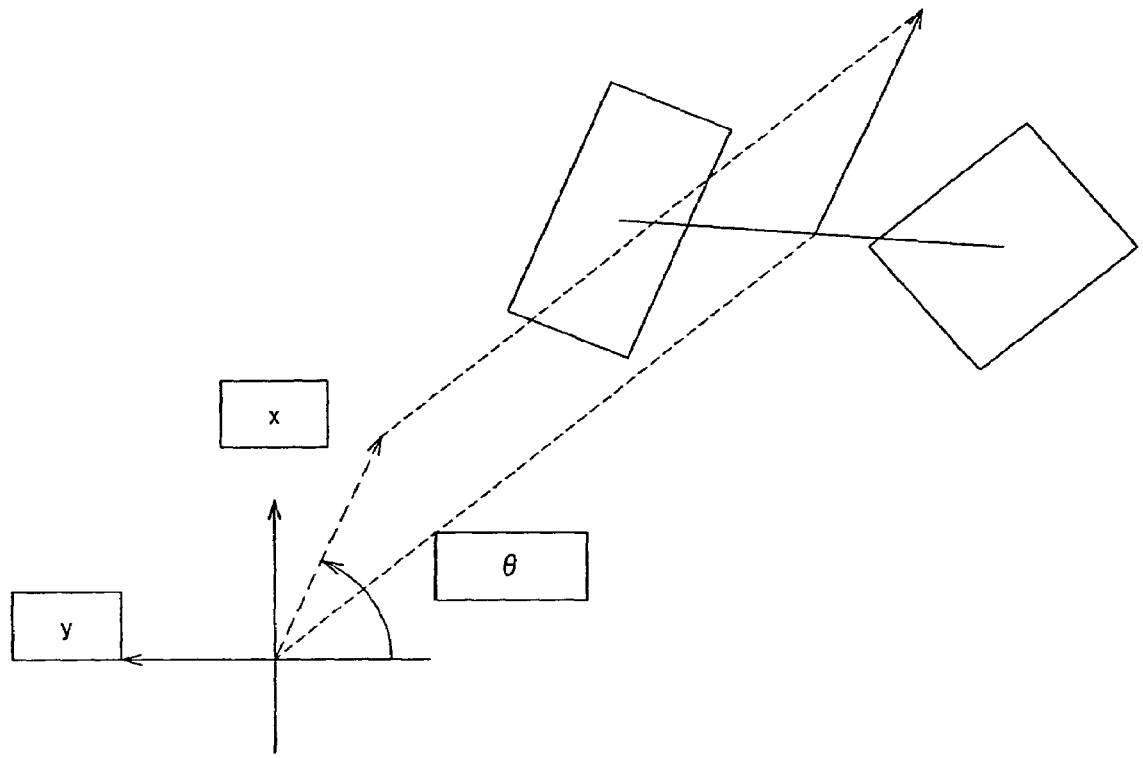
FIG. 19 shows a direction of the sole in relation to a global position.

(13) Direction θ': Direction with reference to a global position (see FIG. 19)

(14) Designation of direction [True or False]

To create and edit a gait pattern, appropriate walking parameters are entered for each step, and they are disposed on the time base. The gait pattern generator according to the embodiment of the present invention has not to designate any detailed trajectories of leg joints in bipedal walking for these data can be derived from the walking parameters by performing operations under a software.

Figure 20:
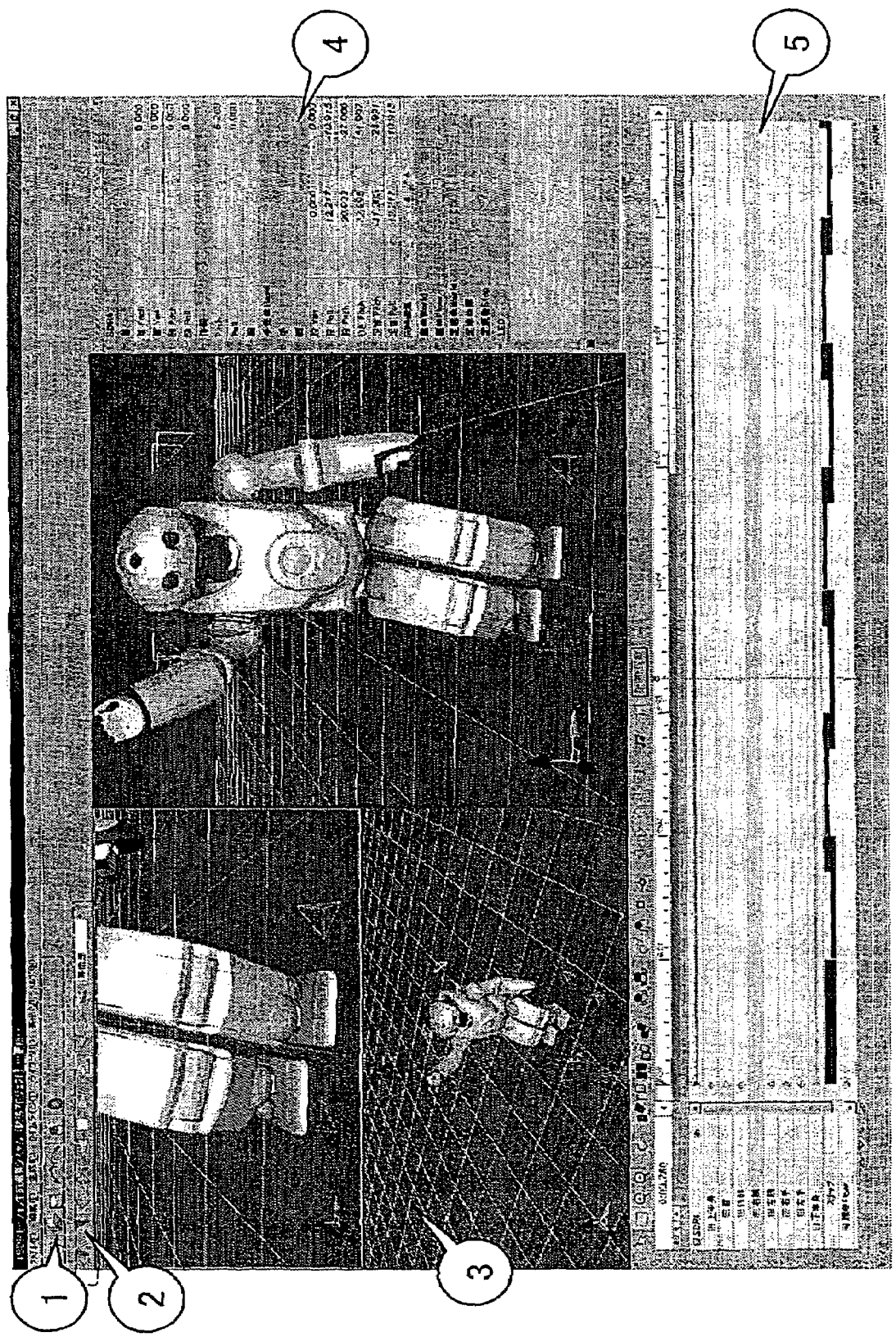
FIG. 20 shows an example of a screen for a gait pattern edition by a gait pattern generator.
Figure 21:
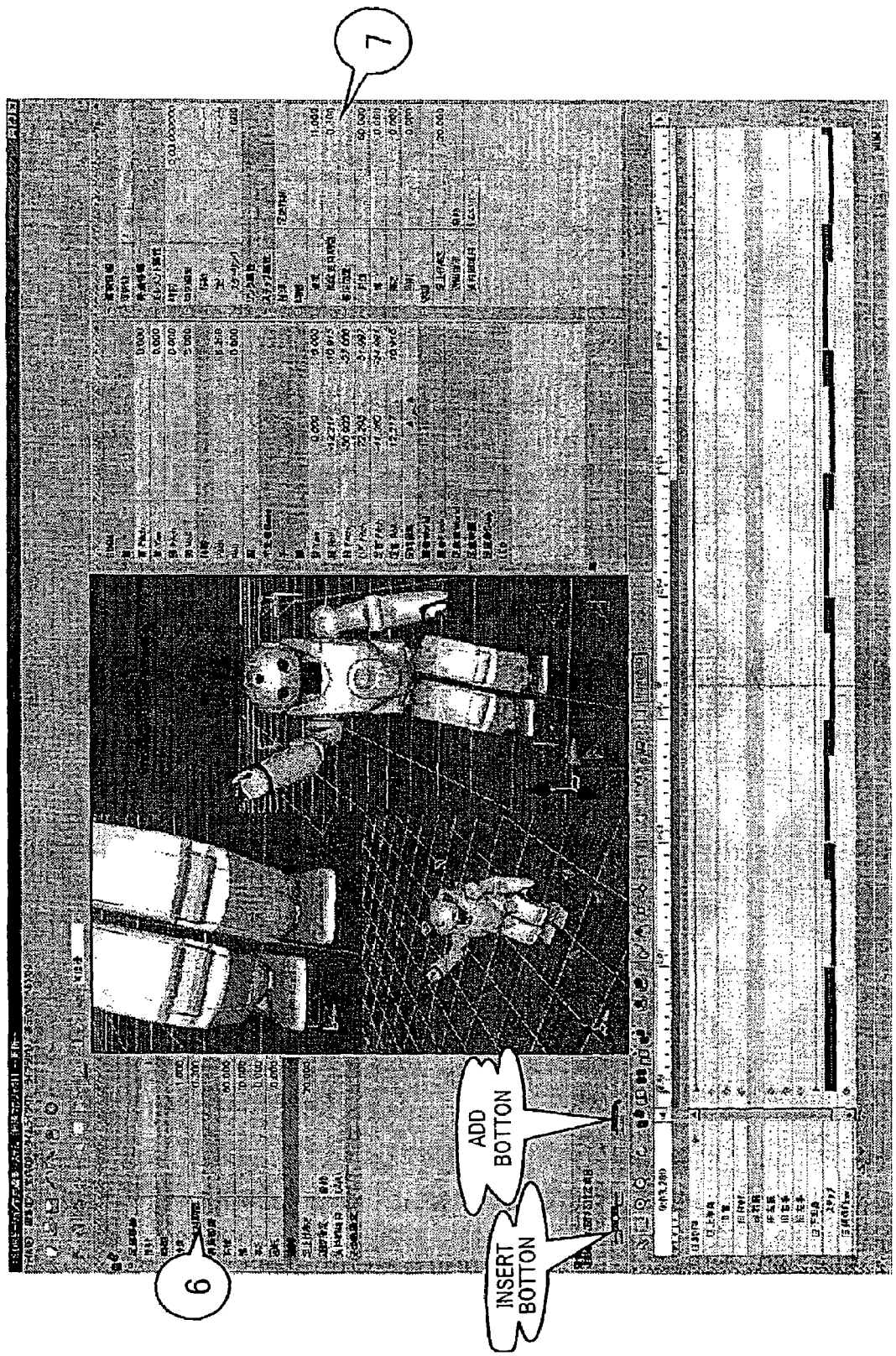
FIG. 21 shows another example of the screen for a gait pattern edition by the gait pattern generator.

FIGS. 20 and 21 show examples of the screen for a gait pattern edition by the gait pattern generator. As shown, designed walking parameters are displayed in a time line window, and a motion of the lower body of the robot is displayed in the 3D viewer. The composition of this edition screen will be explained below.

(1) Standard tool bar

In a screen portion indicated with a reference 1 in FIG. 20, there are disposed tool buttons to given commands to save and load edition data and undo and redo an edition.

(2) Play tool bar

In a screen portion indicated with a reference 2 in FIG. 20, there are disposed tool buttons for supporting playback of edition data, stop of playback, slow playback, single-frame advance, playback of a designated range, etc. along the time base.

(3) 3D viewer

A screen portion indicated with a reference 3 in FIG. 20 is a window in which edited motion data is displayed. A robot status at a currently designed time is displayed as a 3D character. On this 3D viewer screen, a display position, rotation and zooming can freely be set to display a robot animation character at a desired angle and size. Also, as the time passes in playback of motion data, the 3D display is updated every second and a motion of the robot can be confirmed.

(4) Robot status display window

A screen portion indicated with a reference 4 in FIG. 20 is a window in which there is displayed a robot status being currently displayed in the 3D display window. In the example shown in FIG. 20, there are displayed each articulation of the robot, angular speed, angular acceleration, position and posture of the robot viewed from the world coordinate system, position and posture of the foot sole, etc. Also, as the time passes in playback of motion data, these items will be updated in value every second.

(5) Time line window

A screen portion indicated with a reference 5 in FIG. 20 is a window in which each edition of a step is displayed time-serially. A time schedule runs from the right toward the left in the window. The time schedule can freely be changed in scale. Two stripe-like time lines, upper and lower, are displayed in this time line window. The upper time line indicates a step of the left foot, while the lower time line indicates a step of the right foot. Namely, a step is represented by a square block corresponding to one step, placed at a time in consideration on each of the time lines. When there are edition data on 10 steps, for example, 10 blocks will be disposed on the time line.

Figure 22:
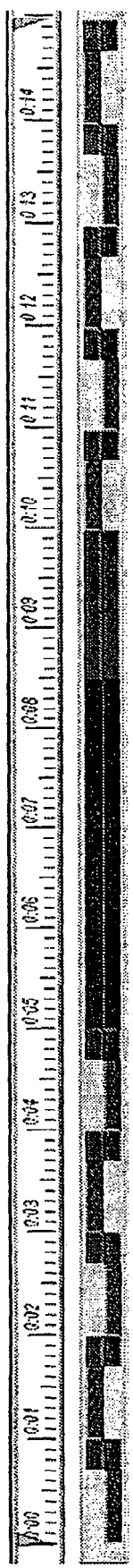
FIG. 22 shows a time line window in an enlarged scale.
Figure 23:
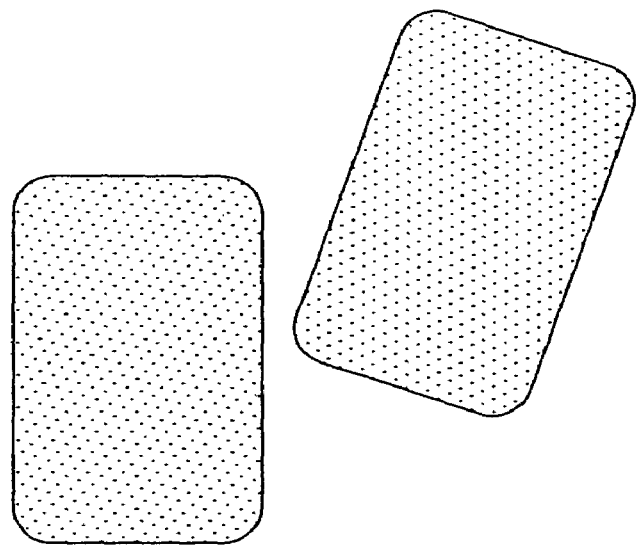
FIG. 23 shows a step icon.
Figure 24:
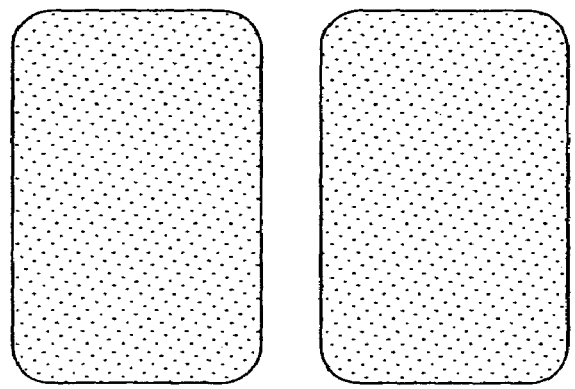
FIG. 24 shows a pause icon.

FIG. 22 shows a time line window in an enlarged scale. The example shown in FIG. 22 is an edition of such a motion that the robot walks 5 steps for first 5 sec, stands still (takes a pause) for a period of 5 sec from the first 5-sec time point (namely, for a time period down to 10-sec time point), and then walks 5 steps for 5 sec from the 10-sec time point. Namely, the robot will take a pause, without walking, for the time period from the first 5-sec time point to the 10-sec time point. To clarify a time section in which the robot should not walk, the time line edition has the concept of a pause introduced therein in addition to the concept of the step. On the gait pattern edition screen, a step is represented by an icon as shown in FIG. 23, and a pause is represented by an icon as shown in FIG. 24.

In FIG. 21, there is shown a composition example of the gait pattern edition screen having added thereto commands and buttons necessary for edition of a step.

The insert button is to designate insertion of a step or pause at a current time (time point of interest on the time line). With an inserting operation using this insert button, the display on the screen is updated to a display in which a step or pause is inserted at the current time on the time line. Also, the add button is to designate addition of a step or pause to the end of the time line. With an adding operation using this add button, the display on the screen is updated to a display in which a step or pause is added to the end of the time line.

(6) Step creation window

A screen portion indicated with a reference 6 in FIG. 21 is a window in which a step is to be created. An input field for walking parameters is disposed in this screen area. By pressing the insert or add button located in the lower portion of this window (as have previously been described) after freely setting parameters for creation of a step in this screen, the step will be added. The additional step is instantly reflected on the time line window and 3D display window.

(7) Parameter window

A screen area indicated with a reference 7 in FIG. 21 is a parameter window in which parameters of a step selected on the time line are displayed. Changes of the parameters, if any, will instantly be reflected on the time line window and 3D display window. Also, a time for a step can be edited on the parameter window. That is, by entering a time at a moving or copying destination, the time schedule of a step can be moved or copied.

Figure 25:
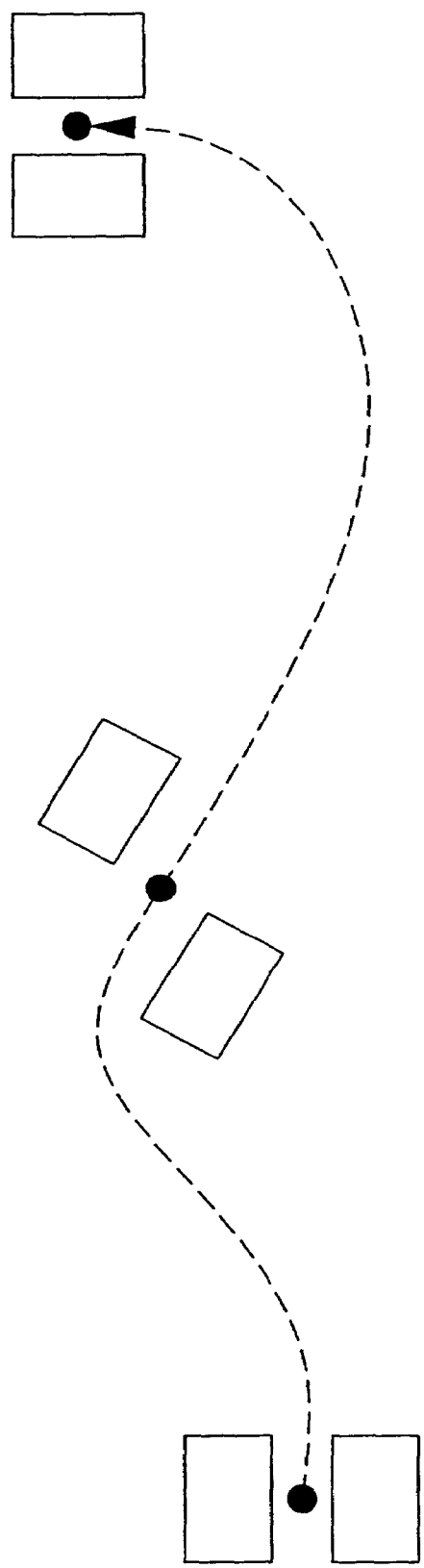
FIG. 25 shows the result of path planning with one route point being set in a path.

Note that the foot trajectory editor has also a function of "path planning" for creating a rough gait pattern. With this function, a walk over a shortest distance can be planned by designating a position and direction of a first step of the gait pattern, positions and directions of some routes points, position and direction of a destination, numbers of steps and time to a next route point and destined position. Also, with this function, it is possible to set a plurality of points for a route position and direction. Alternatively, no route point and direction may be entered. FIG. 25 shows the result of path planning with one route point being set in a path.

E-3. Automatic Correction Incidental to Step Change

The foot trajectory editor is able to create and edit a gait pattern by setting walking parameters for each step with operations made on the edition screen shown in FIGS. 20 and 21 and also is allowed to correct walking parameters for a specific step in the already edited gait pattern with operations made on the parameter window. Further, the foot trajectory editor has also a function to automatically correct a gait pattern as a whole.

When automatically correcting a gait pattern, for example, during automatic correction, the user can designate parameters which should not preferably be corrected as constraint condition. Also, a group of successive steps under the same condition may be defined as "constraint group". In the constraint group, correctable walking parameters are prioritized. An automatic correction is done based on the priority. Major constraint conditions will be listed below:

(1) Step-cycle constraint
(2) On-foot support ratio constraint
(3) Step-length constraint
(4) Foot-down height constraint
(5) Leg-up height constraint
(6) Turning-angle constraint
(7) Swing-foot constraint
(8) Support-leg maintenance constraint
(9) ZMP Pass-point constraint
(10) Direction constraint (either constraint by a current direction or by a set direction is selected at designating a constraint)
(11) Absolute-position constraint
(12) Absolute-time constraint
(13) Relative-position constraint
(14) Relative-time constraint Concerning the relative-position and relative-time constraints of the above constraint conditions, it is allowed to designate a constraint group. Also, in case a step is copied (inserted) as an edition limiting factor to a step under a constraint condition or a constraint, it will be an attribute to the destination constraint group.

Figure 26:
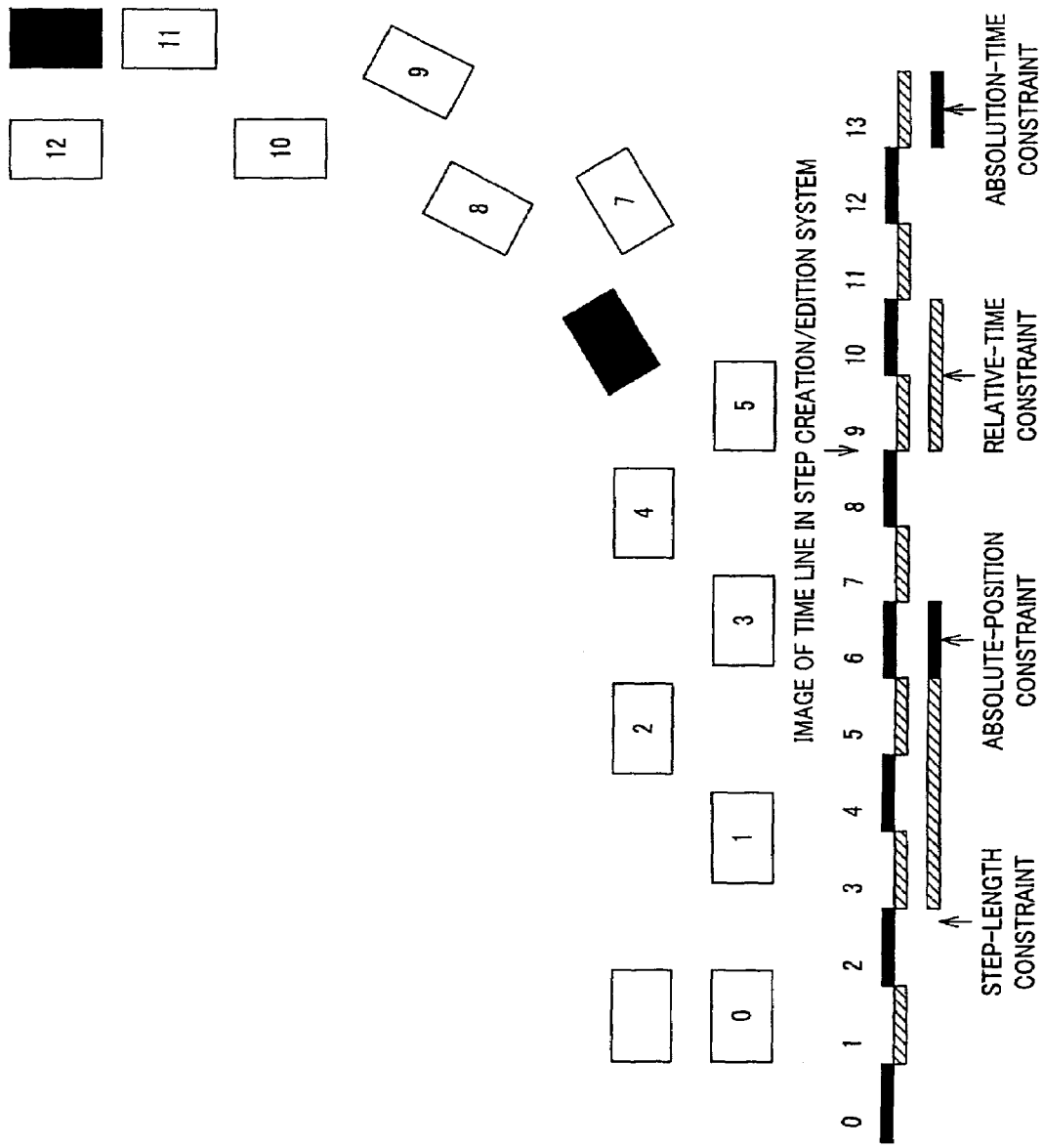
FIG. 26 shows an edited gait pattern as a step trajectory and an image of a time line on which a constraint condition is set on the gait pattern.

FIG. 26 shows an edited gait pattern as a step trajectory and an image of a time line on which a constraint condition is set on the gait pattern.

Also, for automatically correcting a gait pattern, the above constraint conditions and a limiting factor considered as not preferable or as impossible in the respect of the physical and mechanism specifications of the actual robot are taken into consideration. The "limiting factor" referred to herein includes, for example, articulation limit, angular speed limit, angular acceleration limit, etc.

Figure 27:
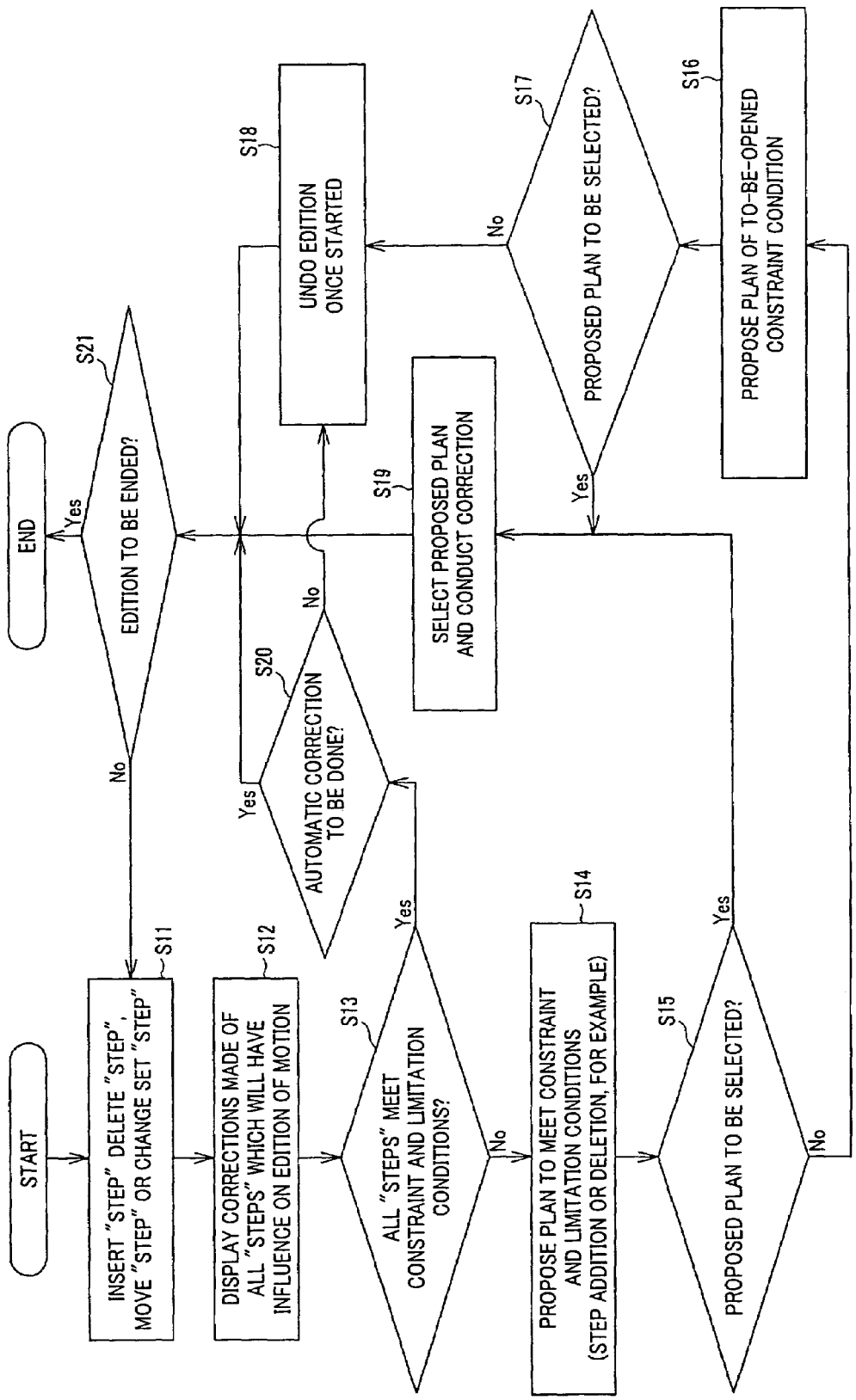
FIG. 27 shows a flow of operations made in an automatic correction of a gait pattern, effected after setting constraint conditions and inserting a step, deleting or moving a step in a group of more than one step under constraint conditions.

FIG. 27 shows a flow of operations made in an automatic correction of a gait pattern, effected after setting constraint conditions and inserting a step, deleting or moving a step in a group of more than one step under constraint condition.

When a step is inserted into, deleted from or moved in a group of more than one step under constraint condition (step S11), all influenceable steps are automatically corrected on the basis of the relation between a constraint group into or from which the step has been inserted or deleted and preceding and following constraint groups, if any (step S12).

Next, it is checked in step S13 if all steps meet the constraint and limiting conditions. If all the steps meet the constraint and limitation conditions, it is checked in step S20 whether automatic correction is to be effected. In case no automatic correction is to be done, the edition once started is undone (step S18). Then, it is inquired of the user in step S21 whether he or she is to exit the edition. In case the user designates exiting of the edition, this processing route as a whole is terminated. If the edition is not to be ended, operation goes back to step S11 where there will be done operations to be done when a step is inserted, deleted or moved or when its setting is changed.

On the other hand, in case there exists any step not meeting the constraint or limitation condition, a plan (step addition or deletion) meeting the constraint and limitation conditions is created and presented to the user (step S14).

When the user selects the proposed plan (step S15), the proposed plan is selected and correction is done (step S19). Then, it is inquired of the user if he is to exit the edition or not (step S21). When exiting of the edition is designated, this processing routine as a whole is terminated. If the routine is not to be terminated, operation goes back to step S11 where there will be done operations to be done when a step is inserted, deleted or moved or when its setting is changed.

When the user does not select the proposed plan (step S15), a plan of to-be-opened constraint condition is presented to the user (step S16). In case the proposed plan is selected by the user (step S17), it is selected and correction is conducted (step S19). Then, it is inquired of the user whether he is to exit the edition (step S21). In case the user designates exiting of the edition, this processing route as a whole is terminated. If the edition is not to be ended, operation goes back to step S11 where there will be done operations to be done when a step is inserted, deleted or moved or when its setting is changed.

Also, if the user does not select the proposed plan (step S17), the edition once started is undone (step S18). Then, it is inquired of the user whether he is to exit the edition (step S21). In case the user designates exiting of the edition, this processing route as a whole is terminated. If the edition is not to be ended, operation goes back to step S11 where there will be done operations to be done when a step is inserted, deleted or moved or when its setting is changed.

In the aforementioned automatic correction procedure, parameters set for the steps within the constraint group are manipulated in the order of their priorities in principle so that steps can be corrected completely within the constraint group as far as possible with no influence on other steps outside the constraint group.

Also, in case steps outside the constraint group will be influenced, the automatic correcting means corrects the gait pattern as less as possible in the order of priorities of parameters set on the steps outside the constraint group or in the same order.

Also, a step under no constraint condition has the parameters thereof passively corrected incidentally to correction of any other step in some cases. In case both steps under no constraint condition before and after the constraint group are under the same condition, the step after the constraint group is preferentially corrected. However, this is not always true depending upon the internal setting.

When an automatic correction is to be done, it is informed via the user interface to the user for inquiry of his decision and acknowledgement of the automatic correction.

Figure 28:
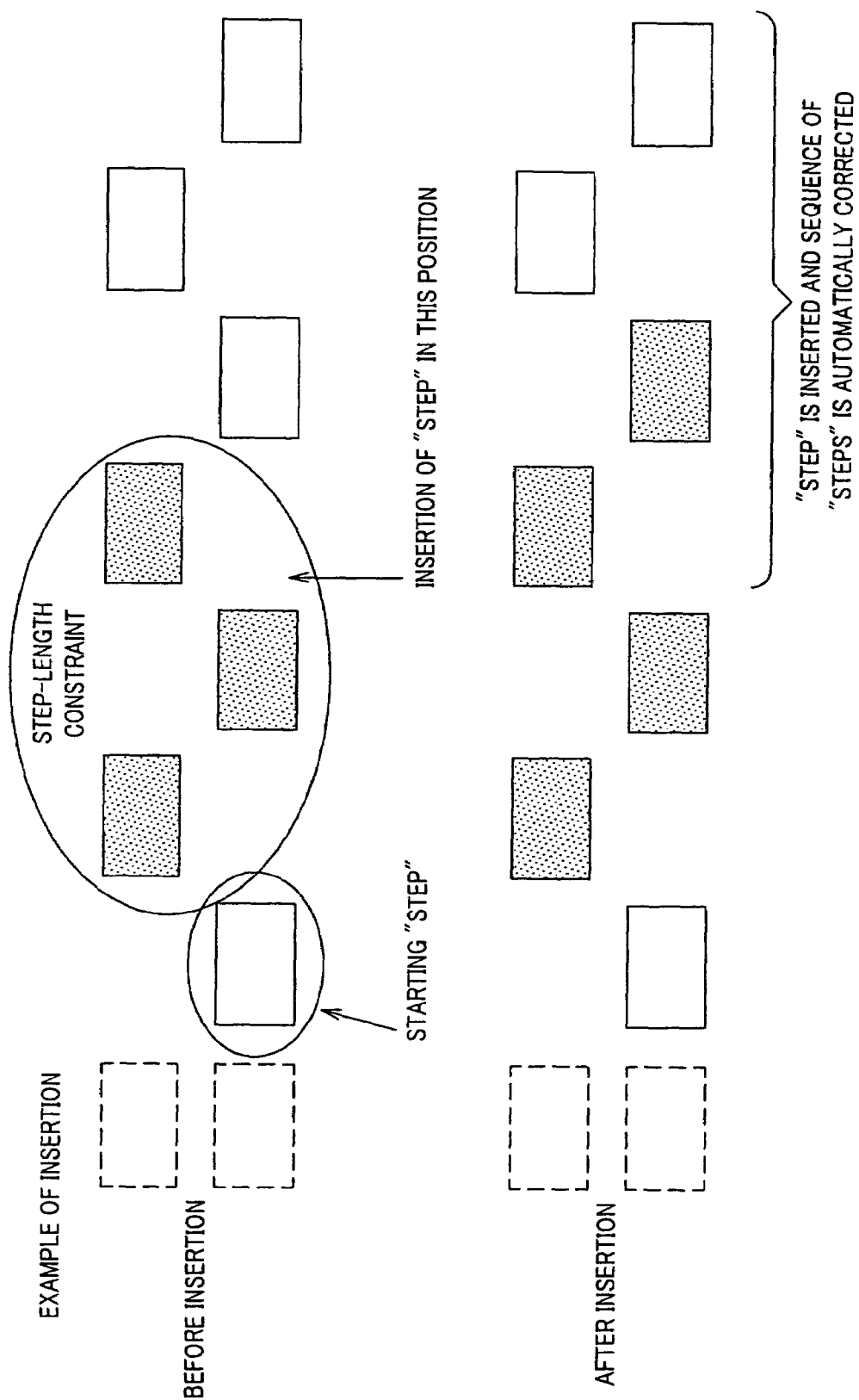
FIG. 28 shows an example of the result of automatic correction made when a step is inserted in case the step length is constrained in a group of more than one step but there exist no other constraint.

FIG. 28 shows an example of the result of automatic correction made when a step is inserted in case the step length is constrained in a group of more than one step but there does not exist any other constraint.

In the step-length constraint, the step length is constraint in a group of more then one step. In case a step is inserted or deleted when there is no other constraint condition, one step will be simply inserted (or deleted) if there are no other constraint conditions before and after the step group. A step existing after the time of step insertion will be varied relatively. Of course, a step not after but before the step insertion time may be varied.

Also, a plurality of constraint conditions can be added for a step. For example, by setting an absolute-position, directional and absolute-time constraints for a starting step, the starting position, time and direction can be constrained.

Figure 29:
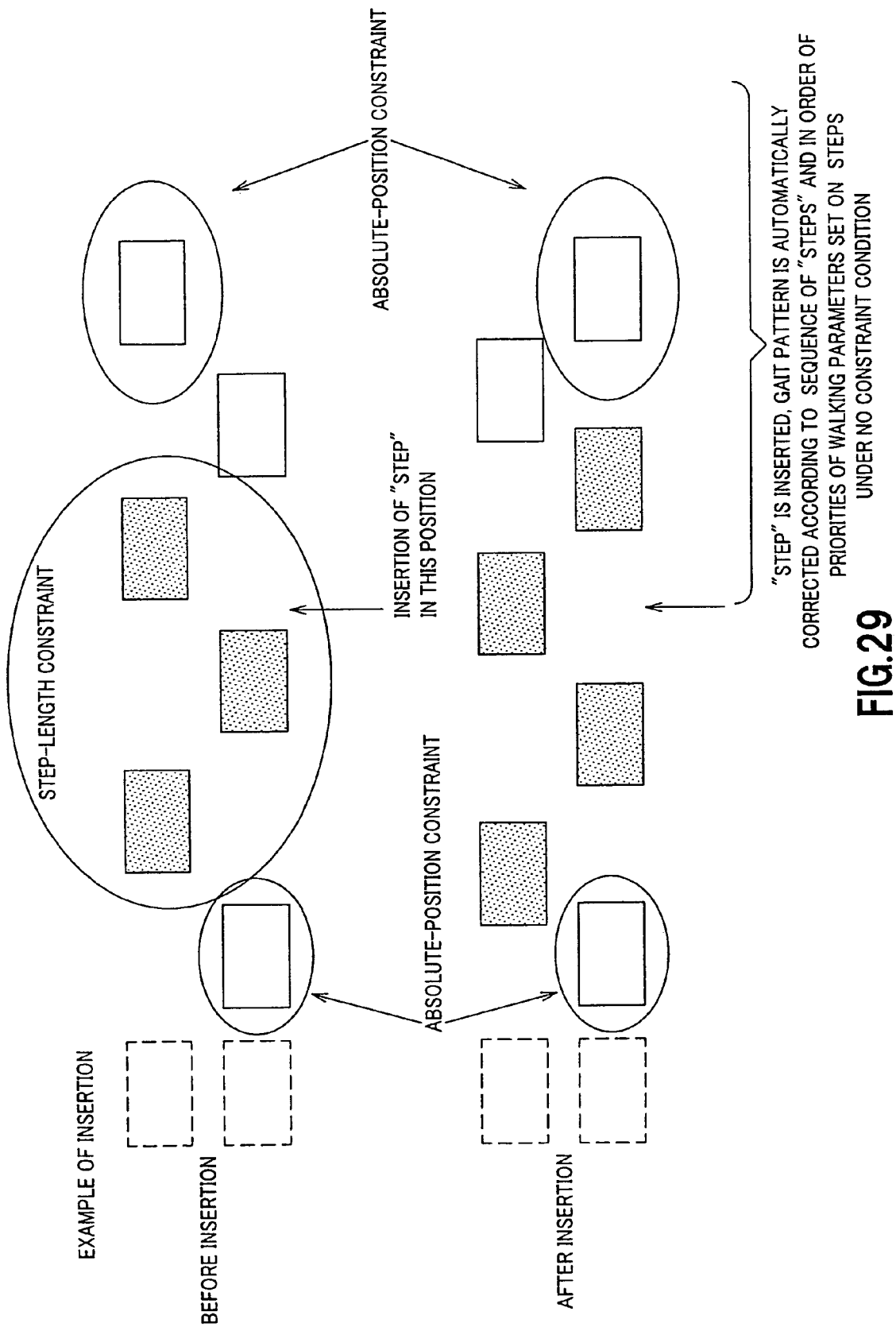
FIG. 29 shows an example of the result of automatic correction made when a step is inserted in case the step length is constrained in a group of more than one step but there exists another constraint.

Also, FIG. 29 shows an example of the result of automatic correction made when a step is inserted in case the step length is constrained in a group of more than one step but there exists another constraint.

Figure 30:
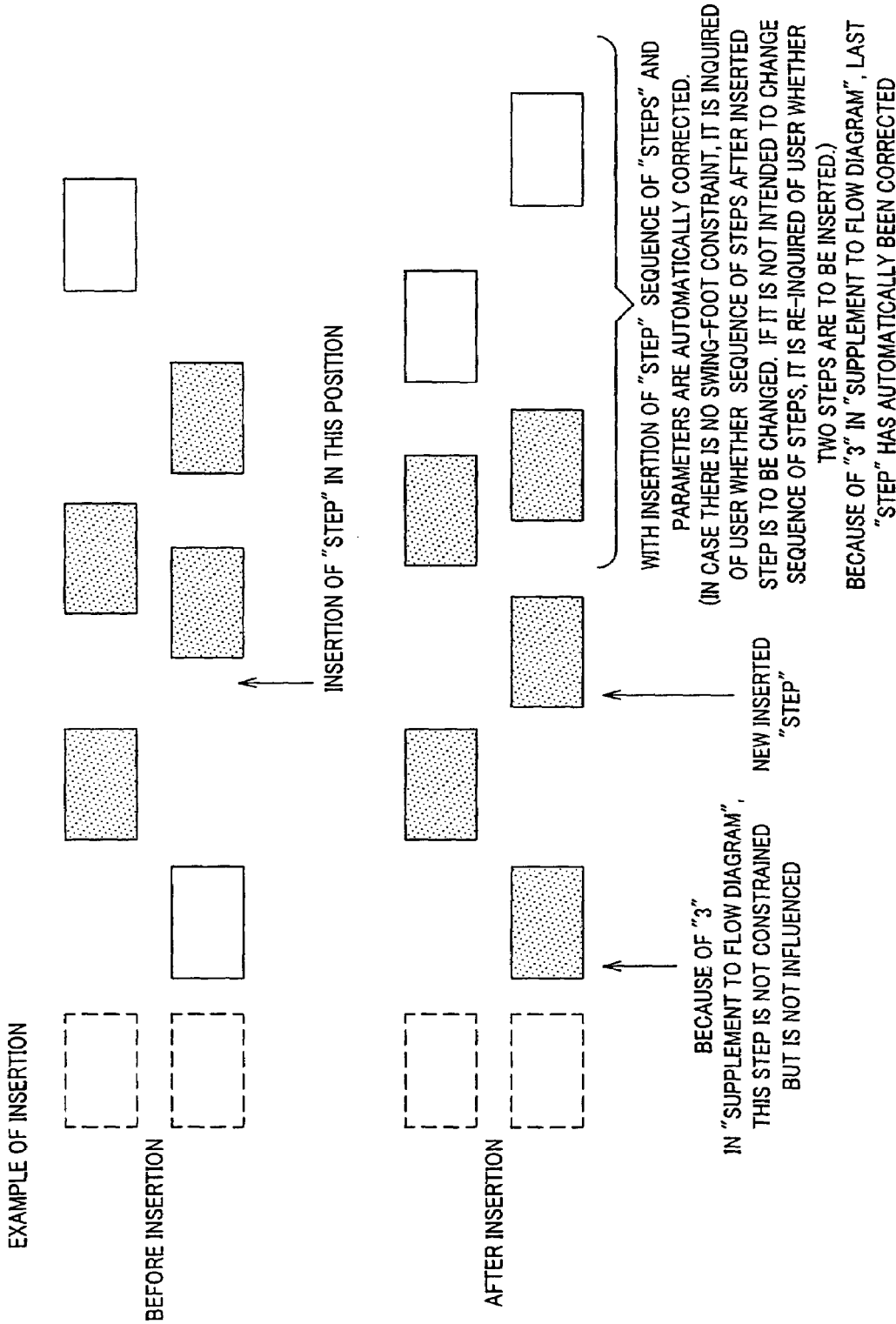
FIG. 30 shows an example of the result of automatic correction made when a step is inserted or deleted in case the step cycle is constrained in a group of more than one step but there exists no other constraint.

Also, FIG. 30 shows an example of the result of automatic correction made when a step is inserted or deleted in case the step cycle is constrained in a group of more than one step but there does not exists any other constraint.

In this case, if there is no other constraint condition before and after the step group, a step will be simply inserted (or deleted) but a step after the time of step insertion will be varied relatively. Of course, a step not after but before the step insertion time may be varied.

In the example shown in FIG. 30, since a step after the time of step insertion is preferentially corrected, steps before the time of step insertion will not be influenced even if there is not any constraint condition. On the other hand, a step after the time of step insertion will have its order and parameter automatically corrected because of the step insertion.

In case there is no swing-foot constrain, the user is inquired of whether or not the step after the position of step insertion is to be changed in sequence. In case no change is to be done, the user is inquired again of whether two steps are to be inserted.

Figure 31:
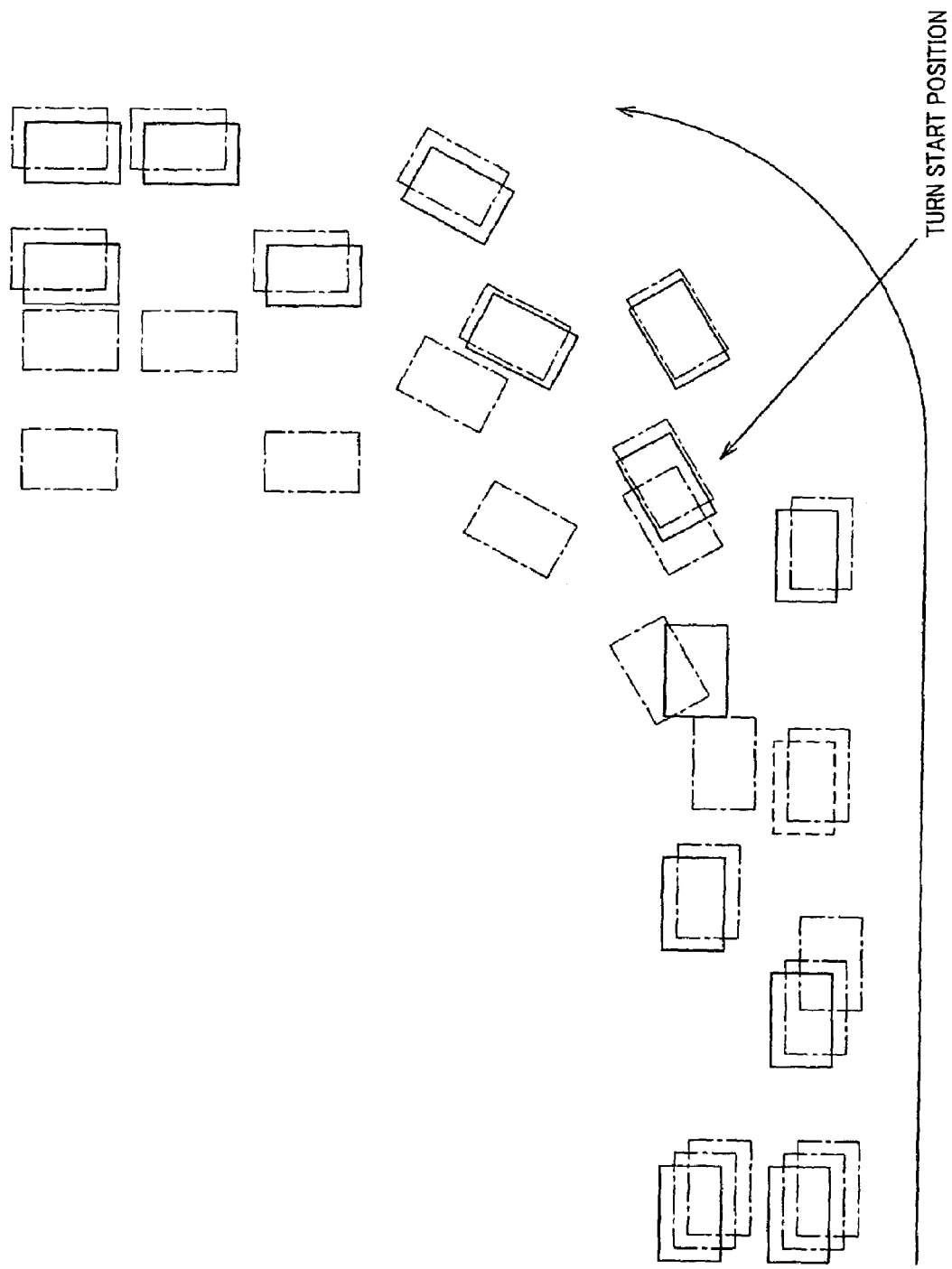
FIG. 31 shows an automatic correction of gait pattern, effected when steps are deleted from a series of gait patterns.

Also, FIG. 31 shows an automatic correction of gait pattern, effected when steps are deleted from a series of gait patterns. The original gait pattern is indicated with a solid line. However, the automatic gait-pattern correction is based on the premise that the restriction that feet are moved alternately for a walking should be abided by.

When one step indicated with a chain line is deleted, the user is prompted to delete two steps in pair for the preference of the step length in case it is allowed to change the turning start position. As a result, the gait pattern will be corrected as indicated with the chain line.

On the other hand, since the turning start position is given the priority under a constrain condition that the turning start position should not be changed, two steps in pair are deleted to automatically adjust the previous length of a step before the deleted step. As a result, the gait pattern will be corrected as indicated with a chain double-dot line.

E-4. Design of Pelvis Movement

The articulation of each of the right and left legs is calculated based on the positions and postures of the pelvis and inverse kinematics. By editing trajectories of the position and postures of the pelvis according to a time series determined by a gait pattern, it is possible to design a movement of the pelvis. A trajectory of the leg articulation is calculated based on a gait pattern and movement of the pelvis. The pelvis movement is edited with the control point and aforementioned interpolating functions. Just by slightly displacing the pelvis trajectory from a default one determined based on the foot trajectory, a pelvis movement can be calculated. The pelvis movement can be viewed on the 3D viewer screen of the foot trajectory editor as shown in FIGS. 20 and 21.

E-5. Integration with the Upper Body

The articulation trajectory of the upper body is imported from the motion editor to the foot trajectory editor where it will be integrated with the lower-body motion data. On the 3D viewer screen, there is displayed motion data on the entire robot body. The foot trajectory editor can edit lower-body motion data adjusted to the upper-body motion. Further, the software module of a gait-synchronous arm motion generator used in the actual robot can be utilized in the foot trajectory editor as necessary to create a natural motion synchronous with a gait pattern.

E-6. Verification of Feasibility

The foot trajectory editor can verify the feasibility of motion data created and edited as above before the motion data is applied to an actual robot.

Prior to the feasibility verification, the foot trajectory editor applies the motion stabilizer and gait pattern generator to motion data prepared through the aforementioned process to create a stable motion of the entire robot body. These operations are quite the same as those effected in the actual robot except that all sensor values are ignored.

The motion data on the time line is repeated extracted at every control cycle dt within a range from the start point (t=0) to end point (t=T), and sent to the locomotion engine.

Figure 32:
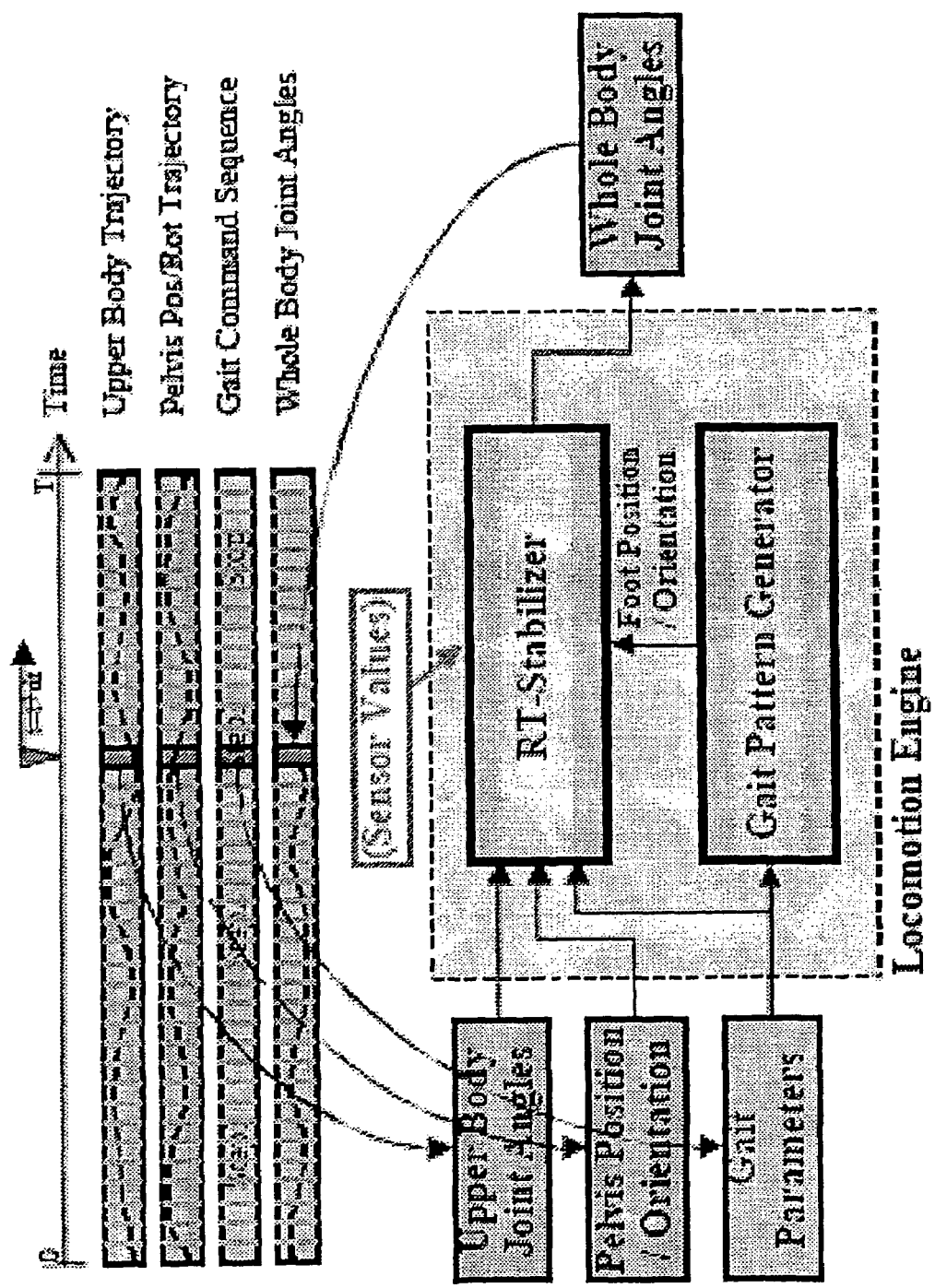
FIG. 32 schematically illustrates the functional composition of a locomotion engine.

FIG. 32 schematically illustrates the functional composition of the locomotion engine. As shown, the locomotion engine includes the aforementioned real-time motion stabilizer and gait pattern generator. The gait pattern generator is supplied with walking parameters and outputs a position and direction of a foot in each of steps included in a gait pattern. Also the real-time motion stabilizer is supplied with the gait pattern, upper-body articulation, and pelvis position and posture from outside the system and also supplied with a position and direction of a foot in each of the steps included in the gait pattern as internal parameters from the gait pattern generator, and outputs a whole-body articulation. The whole-body articulation output is inserted into a corresponding time slot on the time line.

Figure 33:
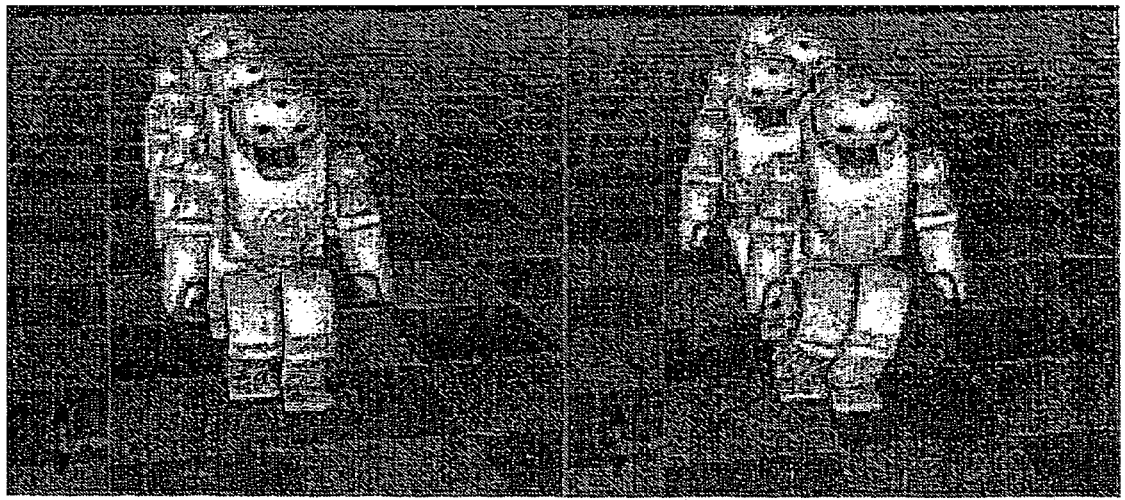
FIG. 33 shows 3D viewer screens showing a walking motion of the robot before viewing and walking motion of the robot whose each step has been stabilized.

FIG. 33 shows 3D viewer screens of a walking motion of an actual robot before viewing, and a walking motion after each step is stabilized, at the right and left, respectively.

The result of stabilization made by the foot trajectory editor is quite the same as that in the actual robot supplied with no sensor inputs. So, it is reasonable to use the result of stabilization for verification of the feasibility of a motion created and edited. The foot trajectory editor utilizes the result of stabilization to detect any hindrance under the limitation by the variable angle and angular speed of each joint. The limit value has some tolerances taking account of an articulation offset resulted from the adaptive control. When the joint trajectory exceeds the limit value, detailed information will be displayed on the edition window.

E-7. Exposed File

The foot trajectory editor has a function to output edited motion data as a motion data file. Thus it can move such a data tile to the actual robot via a transportable storage medium such as a memory stick. Output data on a trajectory of whole-body articulation includes only information on control points and a formula of interpolation between control points. With such a data format, it is possible to reduce the data size rather more than a data format in which the whole-body articulation data are disposed time-serially.

F. Development of Applications

The Inventors of the present invention tried to prepare various motion performances such as dance performance, a-capella chorus performance or emotional expression. There will be explained here below a process of preparing a high-tempo dance performance to introduce an example of the application of the motion editing system according to the present invention.

Figure 35:
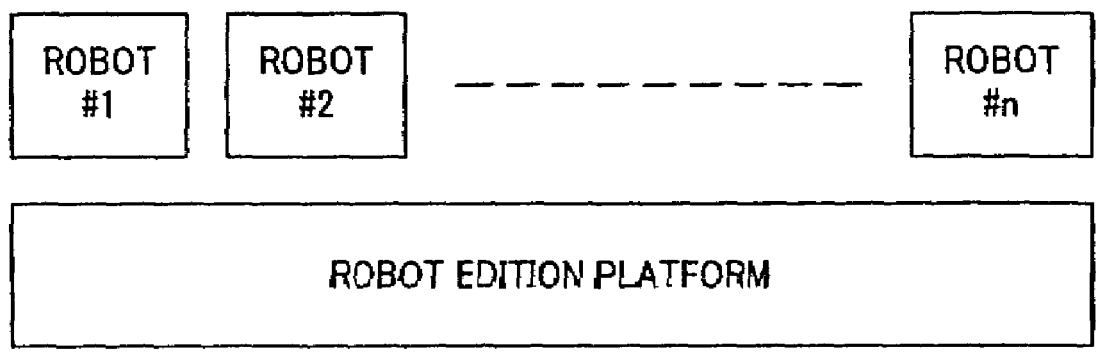
FIG. 35 schematically illustrates the multi-robot editing environment.

The motion editing system according to the present invention provides a multi-robot edition environment (see FIG. 35) and also is capable of creating and editing motions of a plurality of robots. A high-tempo dance performance created by the motion editing system includes dance motions performed by four actual robots, and the formation of the dance motions is altered in the actual robots synchronously with a music played for about 2 minutes.

First, a music is loaded into this system. Then, while listening to the music, the user creates a motion for the upper body using the motion editor. Next, the foot trajectory editor is used to create dancing steps.

In this process, the project manager manages a motion project and swaps upper-body data and lower-body motion data with each other to synchronize the editions of the upper- and lower-body motion data with each other. Therefore, it is possible to make an editing operation while taking the entire robot body in consideration.

First, a motion for a first actual robot is created. Next, motions for the remaining three actual robots are created. By reutilizing the motion data for the first actual robot in creation of the motions for the remaining three actual robots, it is possible to simplify the creating/editing operation very much.

Finally, to check the formation, the motion data for all the four actual robots are loaded into the foot trajectory editor and viewed to check that each of the robots behaves as expected.

Figure 34:
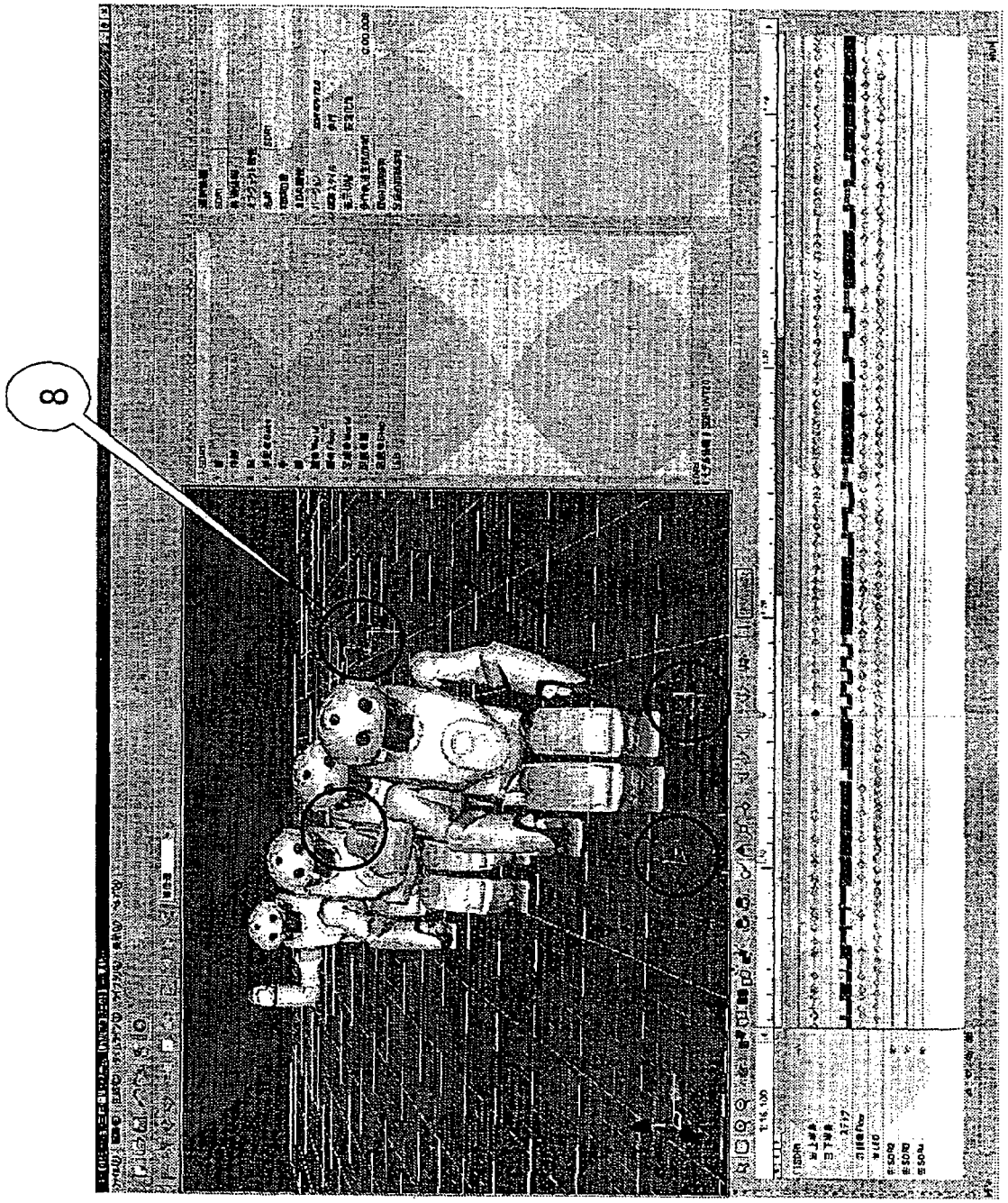
FIG. 34 shows an edition window of a foot trajectory editor, showing motions of a plurality of robots being edited at the same time.
Figure 36:
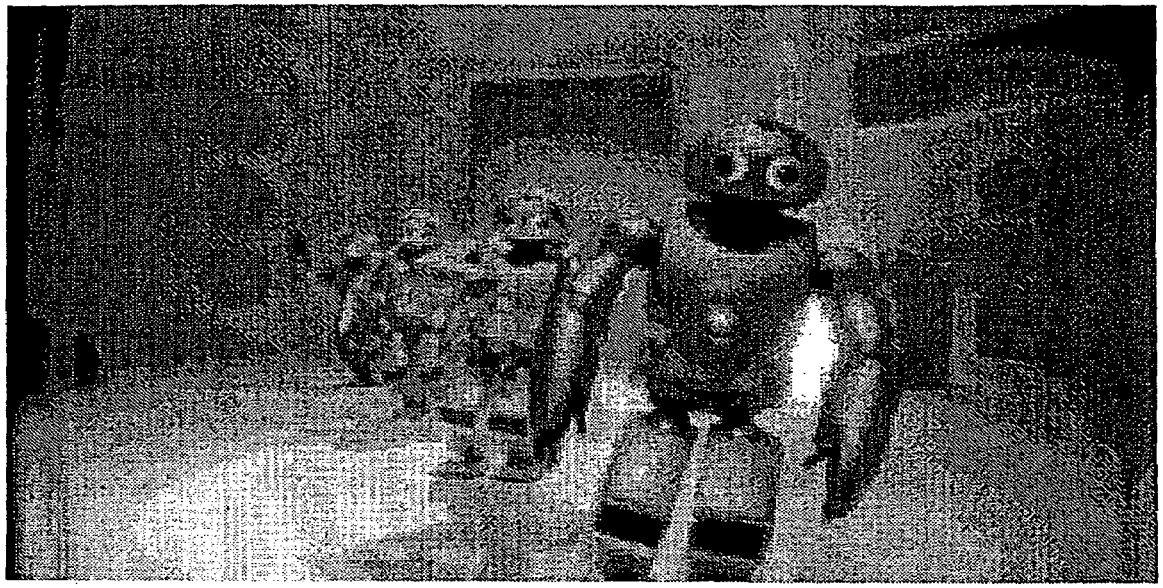
FIG. 36 shows an actual motion performance effected by a plurality of robots.

FIG. 34 shows an edition window of the foot trajectory editor, showing motions of a plurality of robots being edited at the same time. With the step editing application as shown, it is possible to edit motions for a plurality of robots at the same time. In the edition window, a robot for which a motion is being edited is displayed highlighted (in the example shown, an indicator enclosing a corner of a robot in consideration is displayed) for a visual checking on the 3D screen. Also, a robot-status indication window at the right of the 3D display window and time line in the lower position are switched in displayed content for a robot for which a motion is to be edited. Also, FIG. 36 shows an actual motion performance effected by a plurality of robots.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The present invention is not always limited to a product called "robot" but is applicable to a mechanical device designed to mimic the human motions with the use of the electrical or magnetic actions or any other general mobile devices such as toys belonging to other fields of industry.

In other words, the present invention has been described concerning the illustrative working examples and so the description made herein should not be limitedly interpreted but should be interpreted referring to the claims given below.

What is claimed is:

1. A motion editing system for a robot device including an upper body, a lower body formed from a plurality of legs which enable walking of the robot and a plurality of articulations, the system comprising:
   a motion editor for editing motions of the upper body and entire robot;
   a foot trajectory editor for creating a gait pattern and a motion of the upper body and combining the created upper-body motion and motion of the upper body or entire robot, edited by the motion editor to stabilize the entire robot; and
   an automatic correcting means for automatically correcting the entire gait pattern along with step correction,
   wherein the automatic correcting means makes an automatic correction of all influenceable steps on the basis of the relation between a constraint group into or from which a step has been inserted or deleted and preceding and following constraint groups, if any, in response to step insertion, deletion, movement or change of setting.

2. The system according to claim 1, wherein the foot trajectory editor includes the same locomotion engine as that installed in an actual robot.

3. The system according to claim 2, wherein the locomotion engine is a combination of a gait pattern generator and motion stabilizer.

4. The system according to claim 3, wherein the gait pattern generator creates a series or trajectories representing foot positions and directions of both the right and left legs from the sequence of walking commands and parameters.

5. The system according to claim 4, wherein the motion represents a gait pattern as step trajectories of both the right and left legs during a step cycle.

6. The system according to claim 4, wherein the foot trajectory editor allows to correct walking parameters for a specific step in an edited gait pattern.

7. The system according to claim 6, wherein the automatic correcting means can specify, as a constraint, a parameter which should not be changed during automatic correction.

8. The system according to claim 7, wherein the automatic correcting means defines a group of successive steps under the same constraint condition as in a constraint group.

9. The system according to claim 8, wherein in the constraint group, correctable walking parameters are prioritized.

10. The system according to claim 9, wherein if there exists any step not meeting constraint or limitation condition, the automatic correcting means generates a plan meeting the constraint and limitation conditions and proposes it to the user.

11. The system according to claim 10, wherein in case the user does not select the plan, the automatic correcting means proposes, to the user, a plan of to-be-opened constraint condition.

12. The system according to claim 9, wherein the automatic correcting means manipulates parameters set for the steps within the constraint group in the order of their priorities so that the gait pattern can be corrected completely within the constraint group as far as possible with no influence on other steps outside the constraint group.

13. The system according to claim 12, wherein in case steps outside the constraint group will be influenced, the automatic correcting means corrects the gait pattern as less as possible in the order of priorities of parameters set on the steps outside the constraint group or in the same order.

14. The system according to claim 13, wherein in case both steps under no constraint condition before and after the constraint group are under the same condition, the automatic correcting means corrects a step before or after the constraint group preferentially.

15. The system according to claim 2, wherein the locomotion engine makes a real-time creation of a gait pattern by a whole-body integrated control, and stabilizes the foot motion and whole-body motion on the basis of a ZMP equation.

16. The system according to claim 3, wherein the motion stabilizer receives, at each control cycle, a gait pattern and movement of pelvis and joints of the upper body, and calculates a whole-body motion which implements a stable bipedal walking on the basis of the ZMP-based stability criterion.

17. The system according to claim 1, wherein motion creation, correction and stabilization by the motion editor and foot trajectory editor are done on a 3D viewer.

18. The system according to claim 1, wherein the foot trajectory editor outputs data on a stabilized motion in a predetermined file format.

19. The system according to claim 1, wherein the foot trajectory editor data on trajectories of articulations of the entire robot whose motion has been stabilized in a data format including information about a formula of interpolation between control points.

20. The system according to claim 1, wherein to copy edited articulations, the motion editor has a mirror copying function to copy symmetrical articulations of a selected joint and a symmetrical copying function to copy the articulations in both directions.

21. The system according to claim 1, wherein it supports a multi-robot editing environment in which there are created and edited motions of a plurality of robots at the same time.

22. A motion editing method for a robot device including an upper body, a lower body formed from a plurality of legs which enable walking of the robot and a plurality of articulations, the method comprising the steps of:
    editing motions of the upper body and entire robot;
    creating a gait pattern and a motion of the upper body and combining the created upper-body motion and motion of the upper body or entire robot, edited by the motion editing module to stabilize the entire robot; and
    automatically correcting the entire gait pattern along with step correction, wherein the automatic correcting means makes an automatic correction of all influenceable steps on the basis of the relation between a constraint group into or from which a step has been inserted or deleted and preceding and following constraint groups, if any, in response to step insertion, deletion, movement or change of setting.

23. A computer program in a computer-readable format to execute, in a computer system, a motion edition for a robot device including an upper body, a lower body formed from a plurality of legs which enable walking of the robot and a plurality of articulations, the computer program comprising:
    a motion editing module for editing motions of the upper body and entire robot;
    a foot trajectory editing module for creating a gait pattern and a motion of the upper body and combining the created upper-body motion and motion of the upper body or entire robot, edited by the motion editing module to stabilize the entire robot; and
    an automatic correcting module for automatically correcting the entire gait pattern along with step correction,
    wherein the automatic correcting means makes an automatic correction of all influenceable steps on the basis of the relation between a constraint group into or from which a step has been inserted or deleted and preceding and following constraint groups, if any, in response to step insertion, deletion, movement or change of setting.

24. A motion editing system for a robot device including an upper body, a lower body formed from a plurality of legs which enable walking of the robot and a plurality of articulations, the system comprising:
    a motion editor for editing motions of the upper body and entire robot;
    a foot trajectory editor for creating a gait pattern and a motion of the upper body and combining the created upper-body motion and motion of the upper body or entire robot, edited by the motion editor to stabilize the entire robot; and
    an automatic correcting means for automatically correcting the entire gait pattern along with step correction,
    wherein the automatic correcting means can specify, as a constraint or limitation condition, a parameter which should not be changed during automatic correction,
    wherein if there exists any step not meeting the constraint or limitation condition, the automatic correcting means generates a plan meeting the constraint and limitation conditions and proposes it to the user and if the user does not select the plan, the automatic correcting means proposes, to the user, a plan of to-be-opened constraint condition.

25. A motion editing system for a robot device including an upper body, a lower body formed from a plurality of legs which enable walking of the robot and a plurality of articulations, the system comprising:
    a motion editor for editing motions of the upper body and entire robot;
    a foot trajectory editor for creating a gait pattern and a motion of the upper body and combining the created upper-body motion and motion of the upper body or entire robot, edited by the motion editor to stabilize the entire robot; and
    an automatic correcting means for automatically correcting the entire gait pattern along with step correction,
    wherein the automatic correcting means can specify, as a constraint or limitation condition, a parameter which should not be changed during automatic correction and defines a group of successive steps under the same constraint condition as a constraint group in which the correctable walking parameters are prioritized, and wherein the automatic correcting means manipulates parameters set for the steps within the constraint group in the order of their priorities so that the gait pattern can be corrected completely within the constraint group as far as possible with no influence on other steps outside the constraint group, and if steps outside the constraint group will be influenced, the automatic correcting means minimally corrects the gait pattern in the order of priorities of parameters set on the steps outside the constraint group or in the same order.

* * * * *